United States Patent
Fukakusa

(10) Patent No.: US 8,208,360 B2
(45) Date of Patent: Jun. 26, 2012

(54) OPTICAL PICKUP DEVICE AND OPTICAL DISK DRIVER USING THE SAME

(75) Inventor: Masaharu Fukakusa, Kumamoto (JP)

(73) Assignee: Panasonic Corporation, Osaka (JP)

( * ) Notice: Subject to any disclaimer, the term of this patent is extended or adjusted under 35 U.S.C. 154(b) by 6 days.

(21) Appl. No.: 12/568,520

(22) Filed: Sep. 28, 2009

(65) Prior Publication Data

US 2010/0080105 A1    Apr. 1, 2010

(30) Foreign Application Priority Data

Oct. 1, 2008   (JP) .................................. 2008-256045

(51) Int. Cl.
*G11B 7/00* (2006.01)

(52) U.S. Cl. .................................................. 369/112.23

(58) Field of Classification Search ............... 369/112.23
See application file for complete search history.

(56) References Cited

U.S. PATENT DOCUMENTS

| | | | |
|---|---|---|---|
| 5,087,116 A * | 2/1992 | Taylor, II ...................... | 359/851 |
| 7,738,347 B2 * | 6/2010 | Tsukamoto et al. ..... | 369/112.23 |
| 7,889,620 B2 * | 2/2011 | Fukakusa et al. ........ | 369/112.19 |
| 2008/0062827 A1 | 3/2008 | Tsukamoto | |
| 2009/0040893 A1 * | 2/2009 | Yoshinaka et al. ......... | 369/53.23 |
| 2009/0040910 A1 * | 2/2009 | Fukakusa et al. ........ | 369/112.29 |
| 2010/0034072 A1 * | 2/2010 | Mizuyama ............... | 369/112.23 |

FOREIGN PATENT DOCUMENTS

| | | |
|---|---|---|
| JP | 63-046402 | 5/2002 |
| JP | 2008-090990 | 4/2008 |

* cited by examiner

*Primary Examiner* — Joseph Field
*Assistant Examiner* — Aneeta Yodichkas
(74) *Attorney, Agent, or Firm* — Dickinson Wright PLLC

(57) ABSTRACT

A light source, an objective lens, and an astigmatism generation element producing for light for focus control, and an optical receiver are provided. The astigmatism generation element is interposed between the objective lens and the optical receiver and produces focal points in front of and behind the optical receiver within two mutually orthogonal cross-sectional planes including an optical axis of the reflected light. The astigmatism generation element is a Fresnel mirror that has a plurality of orbicular zones and steps connecting adjacent orbicular zones to each other and that takes the orbicular zones as reflecting mirrors. A depth "d" of the steps is set substantially one-half of a wavelength $\lambda$, and a depth d1 of the innermost orbicular zone of the orbicular zones is made larger than the depth d of the steps. The influence of the steps of the Fresnel mirror is minimized, so that a superior servo characteristic can be exhibited.

5 Claims, 17 Drawing Sheets

------ : LIGHT HAVING WAVELENGTH λ1
—·—·— : LIGHT HAVING WAVELENGTH λ2

OPTICAL DISK IS
CLOSELY POSITIONED

OPTICAL DISK IS
DISTANTLY POSITIONED

OPTICAL PICKUP DEVICE AND OPTICAL DISK DRIVER USING THE SAME

BACKGROUND

1. Field of the Invention

The present invention relates to an optical pickup device and an optical disk driver that are to be built in an electronic device, such as a personal computer, a notebook computer, and the like.

2. Description of the Related Art

FIG. 14 is a schematic diagram of an optical system in a related-art optical pickup device. A light source 201 produces outgoing light 215 oriented to an optical disk 211. An integrated prism 202 has therein oblique surfaces 203 and 204. A beam splitter 205 is made in the oblique surface 203. The beam splitter 205 separates from the outgoing light 215 reflected light 216 resulting from the outgoing light 215 undergoing reflection on the optical disk 211, and lets the reflected light 216 travel toward an optical receiver 208. An astigmatism generation element 206 made up of a Fresnel mirror 207 is formed on the oblique surface 204. The astigmatism generation element 206 produces light used in focus control. An objective lens 208 converges the outgoing light 215 on the optical disk 211. An optical receiver 209 has a light receiving section 210, and the light receiving section 210 receives reflected light 216. The optical receiver 209 converts the received light into an electric signal used in focus control, and output the electric signal.

FIG. 15A is an operation diagram of the astigmatism generation element; FIG. 15B is a view showing the geometry of a beam spot achieved when the optical disk is located at a close position; and FIG. 15C is a view showing the geometry of the beam spot achieved when the optical disk is located at a distant position. The astigmatism generation element 220 is; for instance, a cylindrical lens, and generates focal points 224 and 225 at different positions within two mutually orthogonal cross-sectional planes 222 and 223 including an optical axis 221. An optical receiver 227 is interposed between the focal point 224 and the focal point 225. Light entering along the vertical cross-sectional plane 222 passes in an unmodified state through the astigmatism generation element 220 and converges on the forward focal point 224 of the optical receiver 227, to thus enter the optical receiver 227. Meanwhile, light entering the horizontal cross-sectional plane 223 enters the optical receiver 227 so as to converge on the backward focal point 225 of the optical receiver 227, because the astigmatism generation element 220 acts as a concave lens. A spot 226 on the optical receiver 227 assumes a slightly-spread, substantially-circular geometry.

The optical receiver 227 has optical receiving sections 228A to 228D that receive light passed through the astigmatism generation element 220. The optical receiving sections 228 are arranged in the shape of a four-paned window while rotated at an angle of 45 degrees with respect to the cross-sectional planes 222 and 223. The optical receiving sections 228A and 228C are arranged in a horizontal direction, and the optical receiving sections 228B and 228D are arranged in a vertical direction. The optical receiving sections 228A to 228D convert the quantity of received light into an electric signal. Electric signals converted by the respective optical receiving sections 228A to 228D are taken as A to D. A focus error signal FES that is a signal for focus control purpose can be obtained by arithmetic operation of FES=(A+C)−(B+D).

As shown in FIG. 15B, when the optical disk is located at a close position, the focal point 224 comes close to the optical receiver 227, and the focal point 225 moves away from the optical receiver 227. Therefore, the vertical dimension of the spot 226 becomes smaller, and the horizontal dimension of the same becomes larger, whereupon the focus error signal FES becomes greater than zero (FES>0). Conversely, when the optical disk is located at a distant position as shown in FIG. 15C, the vertical dimension of the spot 226 becomes longer, and the horizontal dimension of the same becomes shorter, whereupon the focus error signal FES becomes smaller than zero (FES<0). Focus control is performed in such a way that the focus error signal FES becomes equal to zero (FES=0) or comes to a predetermined value.

FIG. 16 is a cross-sectional view of an ordinary reflecting mirror and a Fresnel mirror 231. The Fresnel mirror 231 is a reflecting mirror that is made by cutting the ordinary reflecting mirror 230 in round slices along respective contour lines spaced apart from each other at a predetermined depth "d" and arranging the thus-cut round slices within a single thickness. Therefore, the Fresnel mirror 231 has a plurality of orbicular zone 232 and steps 233 that each connect adjacent orbicular zones 232. In the case of the Fresnel mirror 231, the zones 232 correspond to reflecting mirrors.

FIG. 17 is a plan view of an astigmatism generation element made up of a related-art Fresnel mirror. In FIG. 17, lines correspond to the steps 213, and areas located between the lines correspond to the zones 212. In the astigmatism generation element 206 made up of the Fresnel mirror 207, the steps 213 are made in the form of an inclined concentric oval shape.

Even when a Fresnel lens is used for the Fresnel mirror 207, an optical system of the optical pickup device, such as that mentioned above, can be built. JPS63-A-46402 shows an example using a Fresnel lens as an astigmatism generation element, and JP2008-A-90990 shows an example using a Fresnel mirror.

When the astigmatism generation element corresponds to a Fresnel mirror, the element is usually designed in such a way that a center portion of light reflected from the optical disk enters the innermost orbicular zone of the astigmatism generation element at an incident angle of 45° and exits at an exit angle of 45' after undergoing reflection. However, the light reflected form the optical disk enters the astigmatism generation element in a spread manner. The reflected light enters an orbicular zone adjacent to a step located outside the innermost orbicular zone and an orbicular zone adjacent to a step located outside the second innermost orbicular zone, as well as entering the innermost orbicular zone. The step is a discontinuous area of the reflecting mirror, and incoming light enters the step at an inclination. Therefore, the light entered the step does not travel in a predetermined direction even after undergoing reflection and does not correctly enter the optical receiver. When resultant influence is great, a servo characteristic, which would originally be expected, cannot be exhibited in some cases.

SUMMARY

The present invention is for solving the problems and aims at providing an optical pickup device and an optical disk drive that minimize influence of steps of a Fresnel mirror, thereby exhibiting a superior servo characteristic.

In order to solve the problem, an optical pickup device of the present invention comprises: a light source emitting light toward an optical disk; an objective lens converging the outgoing light from the light source on the optical disk; an optical receiver receiving reflected light, the reflected light being the outgoing light passed through the objective lens after the outgoing light is reflected on the optical disk; and an astigmatism generation element interposed between the objective lens and the optical receiver for generating light for focus control purpose that produces focal points in front of and behind the optical receiver within two mutually orthogonal cross-sectional planes including an optical axis of the reflected light, wherein the astigmatism generation element is a Fresnel mirror that has a plurality of orbicular zones and steps connecting adjacent orbicular zones to each other and that takes the orbicular zones as reflecting mirrors; and a difference in elevation (hereinafter sometimes called simply a "depth") of the steps is set to a substantially one-half of the wavelength, and an elevation difference of innermost orbicular zone of the orbicular zones is made larger than the elevation difference of the steps.

An elevation difference of steps that is substantially one-half of a wavelength is the minimum one of dimensions at which a difference between a roundtrip optical path of light passing through higher portions of the steps and a roundtrip optical path of light passing through lower portions of the steps is substantially a natural-number multiple of the wavelength and at which a phase difference does not arise. Therefore, the influence of the steps attributable to a phase difference is minimum, and a proportion of light that does not travel in a predetermined direction as a result of being shaded by the steps is also minimum. Moreover, an elevation difference of the innermost orbicular zone is made larger than the elevation difference of the steps, whereby the step located immediately outside the innermost orbicular zone can be arranged at a much outer position. Therefore, the steps can be arranged at positions spaced apart from the neighborhood of the center where influence on a servo characteristic is great.

DETAILED DESCRIPTION

First Embodiment

A first embodiment will be described by reference to the drawings. First, an overview of an optical pickup device of the first embodiment will briefly be described.

FIG. 1A is a schematic diagram of an optical system in an optical pickup device of a first embodiment of the present invention, and FIG. 1B is a cross-sectional schematic view of an astigmatism generation element of the first embodiment of the present invention. FIG. 2A is a view showing the influence of a shadow exerted by a small depth of steps of a Fresnel mirror of the first embodiment of the present invention, and FIG. 2B is a view showing the influence of a shadow exerted by a large depth of steps of the Fresnel mirror. FIG. 3A is a plan view of the astigmatism generation element made up of the Fresnel mirror of the first embodiment of the present invention, and FIG. 3B is a plan view of the astigmatism generation element made up of the Fresnel mirror in which a depth of the innermost orbicular zone is made equal to the depth of the steps.

Figure 1:
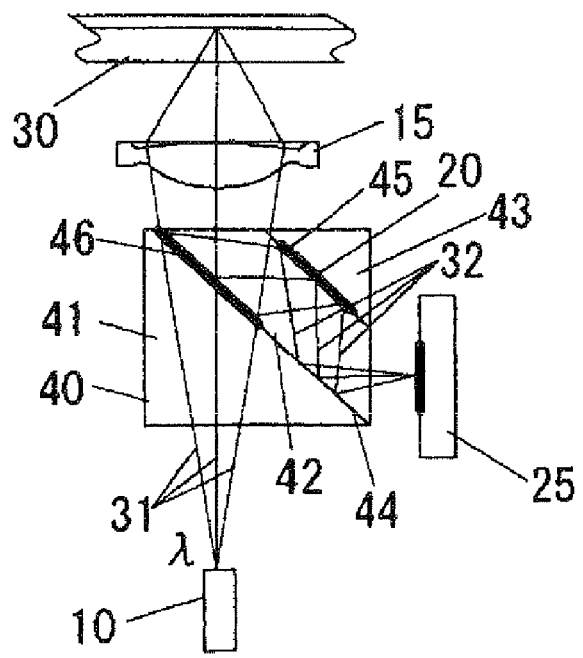
FIG. 1A is a schematic diagram of an optical system in an optical pickup device of a first embodiment of the present invention.
FIG. 1B is a cross-sectional schematic view of an astigmatism generation element of the first embodiment of the present invention.
Figure 1:
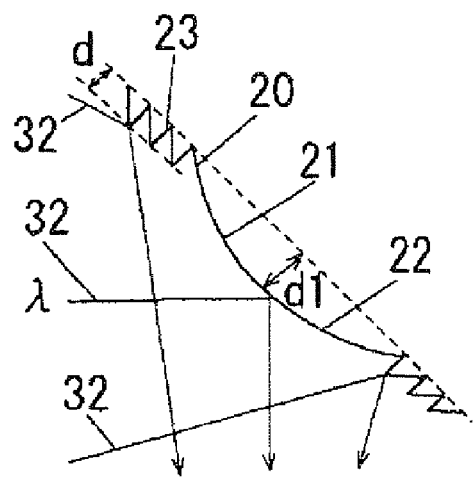

As shown in FIG. 1, a light source 10 emits light toward an optical disk 30. An objective lens 15 lets outgoing light 31 from the light source 10 converge on the optical disk 30. An optical receiver 25 receives reflected light 32 resulting from the outgoing light 31 passing through the objective lens 15 after undergoing reflection on the optical disk 30. The astigmatism generation element 20 is interposed between the objective lens 15 and the optical receiver 25 and produces light for focus control purpose. Focal points of the light are produced in front of and behind the optical receiver 25 and within two mutually orthogonal cross-sectional planes including an optical axis of the reflected light 32. The astigmatism generation element 20 corresponds to a Fresnel mirror 21 that has a plurality of orbicular zones 22 and steps 23 for connecting adjacent orbicular zones 22 and that takes the orbicular zones 22 as reflecting mirrors. The first embodiment is characterized in that a depth "d" of the step 23 is set to a substantially one-half of a wavelength $\lambda$ and that a depth d1 of the innermost orbicular zone 22 of the orbicular zones 22 is made larger than the depth "d" of the step 23.

The depth "d" of the steps 23 that is substantially one-half of the wavelength $\lambda$ is the minimum one of dimensions at which a difference between a roundtrip optical path of light passing through higher portions of the steps 23 and a roundtrip optical path of light passing through lower portions of the steps 23 is substantially a natural-number multiple of the wavelength $\lambda$ and at which a phase difference does not arise. Therefore, the influence of the steps 23 attributable to a phase difference is minimum, and a proportion of light that does not travel in a predetermined direction as a result of being shaded by the steps 23 is also minimum. Moreover, a depth d1 of the innermost orbicular zone 22 is made larger than the depth "d" of the steps 23, whereby the step 23 located immediately outside the innermost orbicular zone 22 can be arranged at a much outer position. Therefore, the steps 23 can be arranged at positions spaced apart from the neighborhood of the center where influence on a servo characteristic is great. Therefore, the influence of the steps 23 in the astigmatism generation element 20 made up of the Fresnel mirror 21 can be lessened, so that a superior servo characteristic can be exhibited.

The optical pickup device of the first embodiment will now be described in detail.

The optical disk 30 is assumed to be a DVD or a CD. The light source 10 is assumed to emit a DVD laser beam having a wavelength $\lambda$=50 nm or a CD laser beam having a wavelength $\lambda$=780 nm toward the optical disk 30. Outgoing light 31 emitted from the light source 10 is diffused light. The light source 10 can also emit a BD (Blu-ray Disc) laser beam having a wavelength $\lambda$=405 nm toward the optical disk 30.

The astigmatism generation element 20 made up of the Fresnel mirror 21 is formed within an integrated prism 40. The integrated prism 40 is made up of three blocks 41, 42, and 43 located in sequence close to the light source 10. A boundary between the block 41 and the block 42 is an oblique surface 44, and a boundary between the block 42 and the block 43 is an oblique surface 45. The oblique surface 44 and the oblique surface 45 are parallel to each other and inclined at an angle of 45° with respect to an outer shape. Although the blocks 42, 43, and 44 are made of optical glass, such as BK-7, they may also be made of an optical plastic, and the like.

A beam splitter 46 is formed in the oblique surface 44. The beam splitter 46 has; for instance, a polarization separation film. The beam splitter 46 lets the outgoing light 31, which has been emitted from the light source 10 toward the optical disk 30, pass in an unmodified form and travel toward the optical disk 30. Further, the beam splitter 46 reflects light 32 resulting from the outgoing light 31 undergoing reflection on the optical disk 30, to thus let the reflected light 32 travel toward the optical receiver 25. Thus, the beam splitter 46 separates the outgoing light 31 emitted by the light source 10 from the light 32 reflected by the optical disk 30.

The astigmatism generation element 20 made up of the Fresnel mirror 21 is formed on the oblique surface 45. The reflected light 32 enters the integrated prism 40 at a substantially right angle with respect to the outer shape of the integrated prism 40. Upon reflection from the beam splitter 46, the reflected light 32 enters the block 42 at an angle of 45° with respect to the astigmatism generation element 20. The astigmatism generation element 20 converts the reflected light 32 in such a way that focal points are produced in front of and behind the optical receiver 25 and within two mutually orthogonal cross-sectional planes including an optical axis of the reflected light 32. The reflected light 32 imparted with such an astigmatism by the astigmatism generation element 20 enters the optical receiver 25 and is used in focus control. As a result of the astigmatism generation element 20 being interposed between the beam splitter 46 and the optical receiver 25, it imparts an astigmatism solely to reflected light without imparting an astigmatism to the outgoing light 31.

The orbicular zones 22 of the Fresnel mirror 21 each have a relatively gentle inclination as a whole and serves as an area where light actually enters and undergoes reflection. The step 23 has a steep inclination and serves as an area that does not substantially contribute to the original function of the astigmatism generation element 20. In the first embodiment, the astigmatism generation element 20 is embodied by the Fresnel mirror 21 but may also be embodied by a diffraction mirror. Further, the geometry of a smooth surface is desirable for the orbicular zones 22, but the geometry of a stepped surface may also be acceptable.

A method for manufacturing the astigmatism generation element 20 made up of the Fresnel mirror 21 is as follows. A gray scale mask that enables exposure of a medium in a predetermined geometry is previously prepared. The gray scale mask is a mask in which transmissivity for light of a wavelength used for exposure undergoes consecutive changes at locations corresponding to the orbicular zones 22. First, a surface of the plate-like block 42 is coated with a resist, and the thus-applied resist is cured. Next, the resist is exposed to UV radiation by way of the gray scale mask that enables generation of a predetermined irregularity pattern for the orbicular zones 22 and the steps 23, and the thus-exposed resist is developed, whereby the irregularity pattern of a predetermined geometry is left in the resist. Further, the resist is etched, thereby generating the irregularity pattern of the predetermined geometry on the surface of the block 42. A photosensitive resin for photolithography may also be used in place of the resist, and the irregularity pattern of the predetermined geometry may also be left in the photosensitive resin. As mentioned above, the irregularity pattern of the predetermined geometry for the orbicular zones 22 and the steps 23 of the astigmatism generation element 20 are generated on the surface of the block 42.

A total reflection film is formed over a surface of the irregularity pattern of the predetermined geometry on the block 42. The total reflection film is a metal film or a dielectric multilayer film. An absorbing film is made over a surface of the total reflection film. The absorbing film is a dielectric multilayer film. Finally, the blocks 42 and 43 are bonded together by means of an UV curable adhesive, and the like.

Moreover, fabrication of the integrated prism 40 is as follows. The beam splitter 46 and the reflection film are formed over the surface of the plate-like block 41 facing the oblique surface 44 or the surface of the plate-like block 42 facing the oblique surface 44. The block 41 and the block 42 are bonded together by means of an UV curable adhesive, and the like. A single large block in which the plate-like blocks 41, 42, and 43 are bonded together is thus produced. The large block is sliced into a predetermined geometry, and the thus-sliced piece is abraded, whereby the integrated prism 40 is fabricated. Of surfaces of the integrated prism 40, surfaces by means of which a laser beam enters and exits may also be provided with an antireflection film.

The Fresnel mirror 21 includes an appropriate depth because of the manufacturing method. If the depth of the entire Fresnel mirror is excessively small, the geometrical precision of the orbicular zones 22 will be deteriorated. When the depth of the entire Fresnel mirror is 0.1 μm or more, the geometry of the orbicular zone is on a usable level. When the depth is 0.2 μm or more, the orbicular zones 22 having a rather superior geometry are obtained. When the depth is 0.3 μm or more, the orbicular zones 22 having a superior geometry are obtained. Conversely, when the depth of the entire Fresnel mirror is excessively large, the geometry of the steps 23 become unclear. When the depth of the entire Fresnel mirror is 3.0 μm or less, the geometry of the steps is on a usable level. When the depth is about 2.5 μm or less, the steps 23 having a rather superior geometry are obtained. When the depth is 2.0 μm or less, the steps 23 having a superior geometry are obtained. Therefore, when the depth of the entire Fresnel mirror is set so as to fall within a range from about 0.3 to 2.0 μm, a superior geometry for the orbicular zones 22 and a superior geometry for the steps 23 are obtained.

The objective lens 15 converts the outgoing light 31 into convergent light and lets the convergent light converge on the optical disk 30. The objective lens 15 also converts the reflected light 32 from the optical disk 30 into convergent light so as to converge on the optical receiver 25. In the first embodiment, the objective lens 15 converts diffused light emitted from the light source 10 into convergent light. However, a collimator lens may also be interposed between the light source 10 and the objective lens 15. In this case, collimated outgoing light 31 enters the objective lens 15, and collimated reflected light 32 exits from the objective lens 15.

The optical receiving sections are arranged in the form of a paned window on the surface of the optical receiver 25 by way of which the reflected light 32 enters. The optical receiver 25 is arranged between the front focal point and the rear focal point generated by the astigmatism generation element 20. The focus error signal FES that is a signal for focus control purpose can be acquired by computation of FES=(A+C)−(B+D). Focus control is performed in such a way that the focus error signal FES comes to zero or a predetermined value.

The depth "d" of the steps 23 of the Fresnel mirror 21 is determined in consideration of the wavelength λ of incoming light, a refractive index η of a medium through which light passes, and an incident angle θ. Specifically, on the assumption that a refractive index η=1 and an incident angle θ=0°, a phase difference between the light entering the Fresnel mirror 21 and reflected outgoing light comes to 0° by making a setting so as to achieve d=nλ/2 ("n" is a natural number), so that interference, which would otherwise occur in the steps 23, is prevented. Let the minimum natural number n=0, then d=λ/2, and the depth "d" of the steps 23 comes to one-half of the wavelength λ.

In consideration of the refractive index η of the medium and the incident angle θ, we have d=nλ/2η cos θ. The depth "d" of the steps 23 is a depth "d" that takes into account the wavelength λ, of incoming light, the refractive index η of the medium through which light passes, and the incident angle θ. Let the minimum natural number n=1, then d=λ/2η cos θ. Namely, the depth "d" of the steps 23 comes to one-half of the wavelength. For instance, let a wavelength λ=0.78 μm which is a wavelength for a CD, a refractive index of BK-7 η=1.51, and an incident angle θ=45°, then "d"=0.37 μm. Let a wavelength λ=0.65 μm which is a wavelength for a DVD, a refractive index of BK-7 η=1.51, and an incident angle θ=45°, then "d"=0.30 μm.

Figure 2:
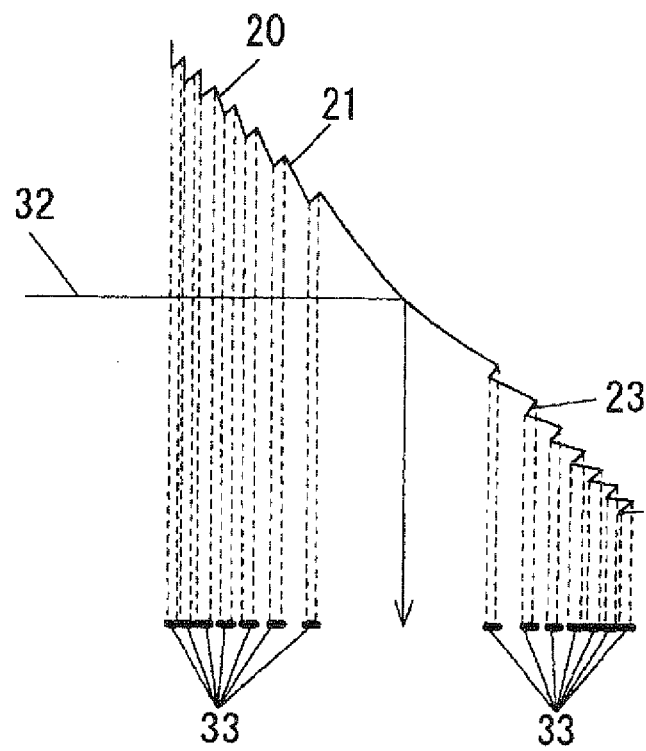
FIG. 2A is a view showing the influence of a shadow exerted by a small depth of steps of a Fresnel mirror of the first embodiment of the present invention.
FIG. 2B is a view showing the influence of a shadow exerted by a large depth of steps of the Fresnel mirror of the first embodiment of the present invention.
Figure 2:
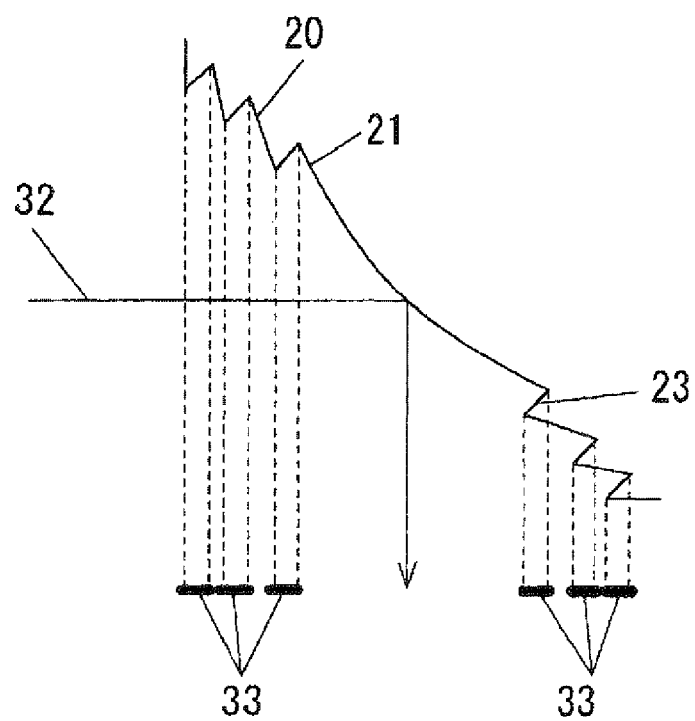
Figure 3:
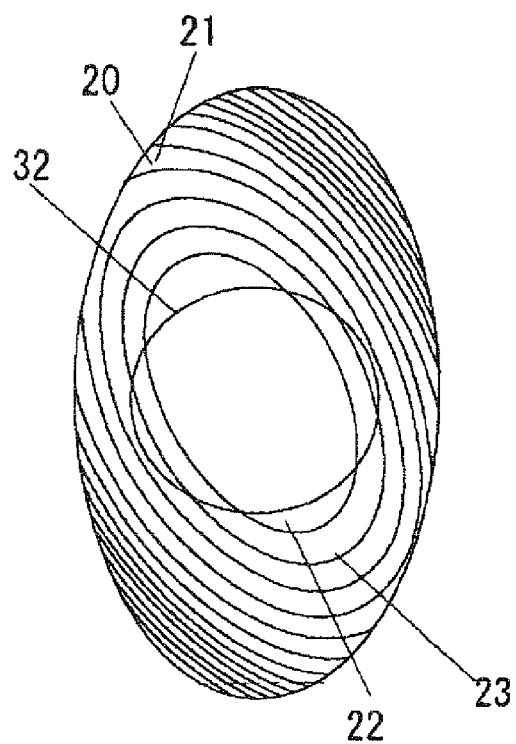
FIG. 3A is a plan view of the astigmatism generation element made up of the Fresnel mirror of the first embodiment of the present invention.
FIG. 3B is a plan view of the astigmatism generation element made up of the Fresnel mirror of the first embodiment of the present invention in which a depth of the innermost orbicular zone is made equal to the depth of the steps.
Figure 3:
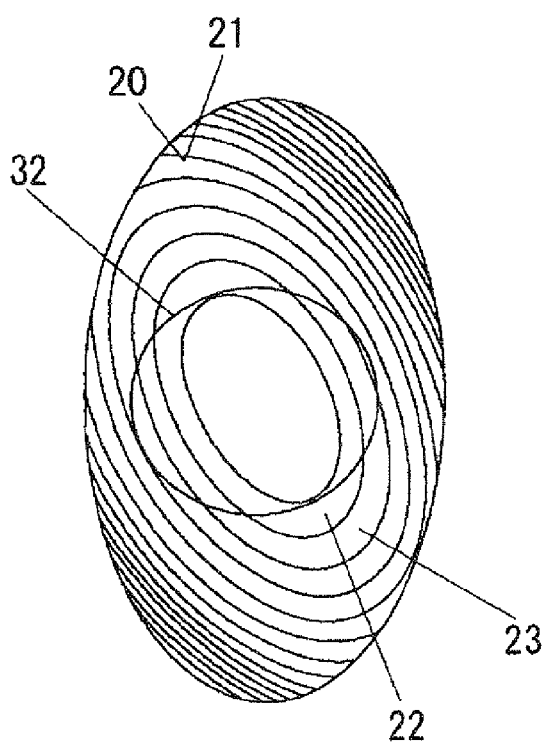

As shown in FIG. 2, when the reflected light 32 enters the astigmatism generation element 20 that is the Fresnel mirror 21 at an incident angle of 45°, a portion of the reflected light 32 is blocked by the steps 23, to thus produce shaded areas 33 because the steps 23 are provided at right angles to the oblique surface 45. When the reflected light 32 enters the optical receiver 25, portions of the light corresponding to the shaded areas 33 are blocked, to thus fail to reach the optical receiver 25. Therefore, a correct amount of light is not detected, which affects a servo characteristic. When the depth "d" of the steps 23 is small, each of the shaded areas 33 is small. However, since the number of steps 23 is large, the number of shaded areas 33 becomes large, and the shaded areas 33 arise in a deep interior location. Meanwhile, when the depth "d" of the steps 23 is large, the dimension of each of the shaded areas 33 becomes large. However, the number of shaded areas 33 is small, and the shaded areas 33 do not arise in an excessively interior location. When each of the shaded areas 33 has a small dimension, the shaded areas 33 and the areas where light normally enters are finely separated on the optical receiver 25. Therefore, an influence achieved when light enters the optical receiver 25 is small. Since the amount of reflected light 32 entering the Fresnel mirror 21 becomes greater toward the center, minimizing the number of steps 23 located at interior positions leads to lessening of influence.

As shown in FIG. 3A, a depth d1 of the innermost orbicular zone 22 among the orbicular zones 22 is set so as to become greater than the depth "d" of the steps 23, whereby the area of the innermost orbicular zone 22 is made larger, so that the steps 23 can be arranged as outside as possible. When compared with the case shown in FIG. 3B, the case shown in FIG. 3A shows that the reflected light 32 enters a smaller number of steps 23 and that the reflected light does not enter the steps 23 from the center up to an outer area of the Fresnel mirror. Therefore, the influence of the steps 23 becomes smaller.

In the Fresnel mirror 21 of the first embodiment, the depth "d" of the steps 23 is reduced to about one-half of the wavelength λ, whereby the minimum depth "d" is selected from among the depths "d" that enable elimination of interference induced by the steps 23. Specifically, there is provided the depth "d" that minimizes the influence of occurrence of interference and the influence of the shades thrown by the steps 23. Further, the depth d1 of the innermost orbicular zone 22 of the orbicular zones 22 is made larger than the depth "d" of the steps 23, whereby the steps 23 can be arranged at the outside positions where the steps are less likely to exert an influence on the optical pickup device. Because of a small influence of the steps 23, the optical pickup device of the first embodiment can exhibit a superior servo characteristic.

In the first embodiment, the best depth "d" of the steps 23 of the Fresnel mirror 21 is described as one-half of the wavelength. However, in reality, it is difficult to set the depth precisely to one-half of a wavelength because of production errors, and the like.

When the depth "d" is one-quarter times or three-quarters times the wavelength λ, the phase difference comes to 180°, and interference is maximized, so that the Fresnel mirror 21 does not function at all. It is considered that the Fresnel mirror 21 acts when the phase difference falls within a range from 0° to 90° or a range from 270° to 360°, and the depths "d" corresponding to the respective phase differences are three-eighths times or more and five-eighths times or less the wavelength λ. Specifically, so long as the depth "d" of the steps 23 of the Fresnel mirror 21 is three-eighths times or more and five-eighths times or less the wavelength λ, the Fresnel mirror can be used under not-so-great influence of interference.

In the first embodiment, the depth d1 of the innermost orbicular zone 22 of the orbicular zones 22 is made larger than the depth "d" of the steps 23. It is desirable that the depth d1 be made equal to the wavelength λ of the reflected light 32 or less. This is intended to prevent the light 32 reflected from the astigmatism generation element 20 made up of the Fresnel mirror 21 from inducing interference.

In the first embodiment, the depth of the Fresnel mirror 21 corresponds to the depth d1 of the innermost orbicular zone 22 of the orbicular zones 22. Since the depth d1 is expressed as $d1=\lambda/\eta \cos\theta$, the maximum depth d1 is 0.73 μm on the assumption that wavelength λ for a CD is 0.78 μm; that a refractive index η of BK-7 is 1.51; and that an incident angle θ is 45°. Since the value of the depth d1 falls within a range from 0.3 to 2.0 μm, a superior geometry for the orbicular zones 22 and a superior geometry for the steps 23 are acquired.

Conversely, the conceivable minimum depth d1 for a DVD in the first embodiment is d1=0.23 μm on the assumption that the depth "d" of the steps 23 is three-eighths times the wavelength λ and that the depth d1 of the innermost orbicular zone 22 of the orbicular zones 22 is slightly greater than the depth "d." Even in this case, a slightly superior geometry for the orbicular zones 22 and a slightly superior geometry for the steps 23 are acquired. However, even when the depth "d" of the steps 23 remains intact, it is preferable that the depth d1 be set so as to assume a value of 0.3 μm or more.

Figure 4:
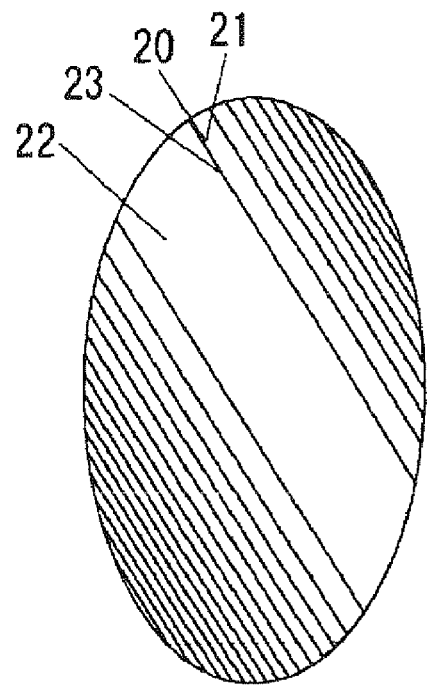
FIG. 4A is a view showing a first example of a geometric pattern of the astigmatism generation element of the first embodiment of the present invention.
FIG. 4B is a view showing a second example of the geometric pattern of the astigmatism generation element of the first embodiment of the present invention.
Figure 4:
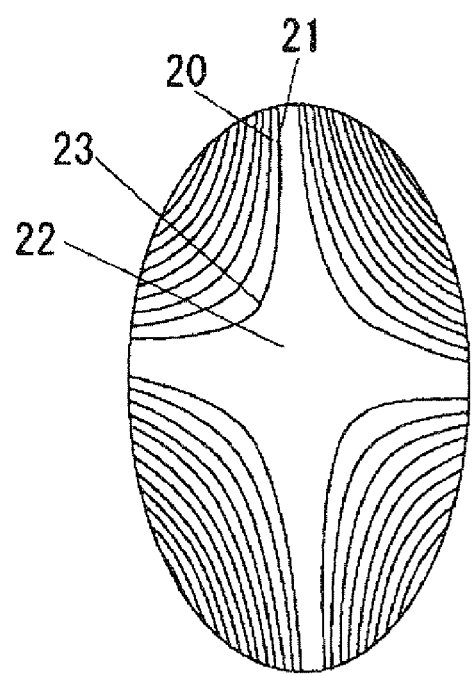

In the first embodiment, the geometrical pattern of the astigmatism generation element 20 made up of the Fresnel mirror 21 is a concentrically oval figure; however, the geometrical pattern is not limited to the concentrically oval figure. FIG. 4A is a view showing a first example geometrical pattern for the astigmatism generation element of the first embodiment, and FIG. 4B is a view showing a second example geometrical pattern for the astigmatism generation element. The geometrical pattern of the astigmatism generation element 20 may also be a linear geometry, such as that shown in FIG. 4A, or a cross geometry, such as that shown in FIG. 4B.

In the first embodiment, the incident angle at which the reflected light 32 enters the astigmatism generation element 20 made up of the Fresnel mirror 21 is described as 45°. However, the incident angle is not limited to 45° and may also be another angle. In such a case, the essential requirement is to perform computation by substituting another incident angle into θ. For instance, when the incident angle is 0°, $d=\lambda/2\eta$ is derived.

In the first embodiment, another advantage is yielded. In a case where the optical disk 30 has two recording layers or more as in the case with a DVD, while light is being converged on; for instance, a predetermined recording layer closer to a front, to thus record or reproduce data, a portion of the light passes through the predetermined recording layer, to thus enter the optical receiver 25 upon reflection from a deep inner recording layer. At this time, the light reflected from the deep inner recording layer converges on a position closer to the optical disk 30 rather than on the neighborhood of the optical receiver 25, such as that shown in FIG. 1A, whereupon the light enters the optical receiver 25 in a spread fashion. Specifically, the light reflected from the deep inner recording layer enters only the innermost orbicular zone 22 of the astigmatism generation element 20 in the form of a spot that is smaller than the spot made by the light 32 reflected from the predetermined recording layer, such as that shown in FIG. 3A. When the objective lens 15 is moved as a lens shift by means of tracking control operation, spots on the astigmatism generation element 20; namely, both the spot originated from the predetermined recording layer located close to the front and the spot originated from the deep inner recording layer, move in the vertical direction over a drawing sheet. Since the diameter of the spot originated from the predetermined recording layer is large, influence on the optical receiver 25 is not great even when the manner of entry of the spot in the steps 23 is changed by the lens shift. However, when a portion of the spot enters the steps 23 as a result of the spot originated from the deep inner recording layer being moved by the lens shift, the influence of the steps 23 is much enhanced because the diameter of the spot is small, and the thus-enhanced influence appears on the optical receiver 25. However, in the case of the first embodiment, since the dimension of the innermost orbicular zone 22 is large, the spot originated from the deep inner recording layer hardly enters the steps 23 even when moved by the lens shift. Therefore, the influence of the steps 23 is hardly exercised, and a resultant effect also makes it possible to stabilize the servo characteristic.

Second Embodiment

Figure 5:
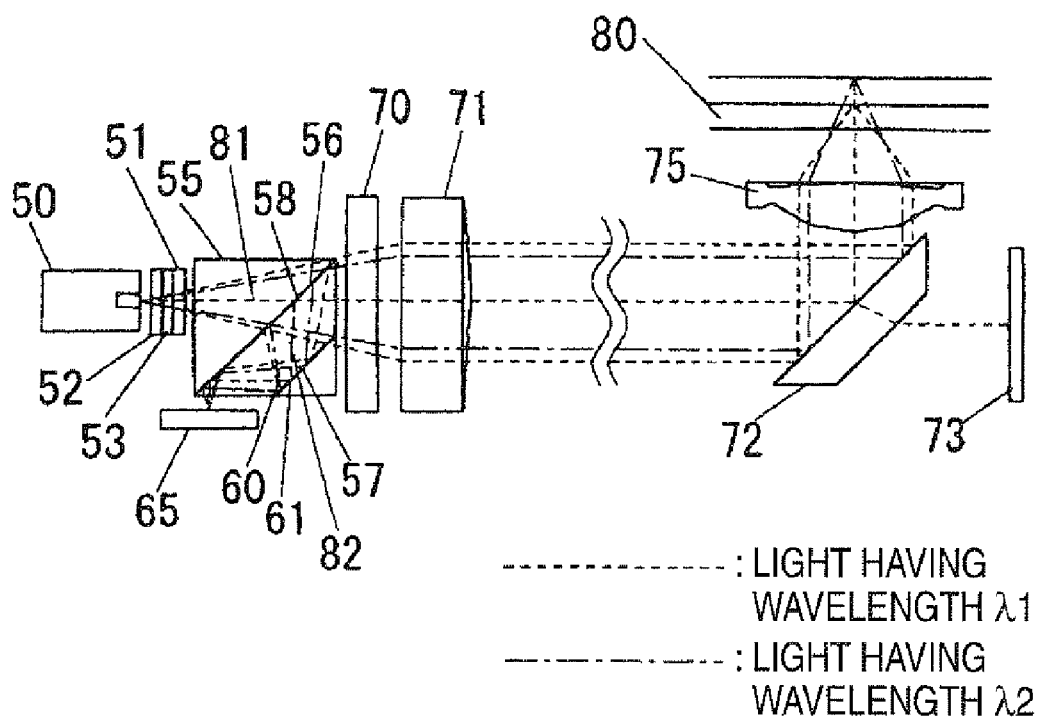
FIG. 5A is a schematic diagram of an optical system in an optical pickup device of a second embodiment of the present invention.
FIG. 5B is a cross-sectional schematic view of an astigmatism generation element of the second embodiment of the present invention.
Figure 5:
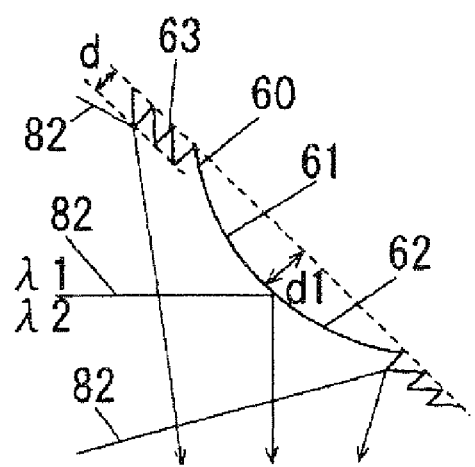
Figure 6:
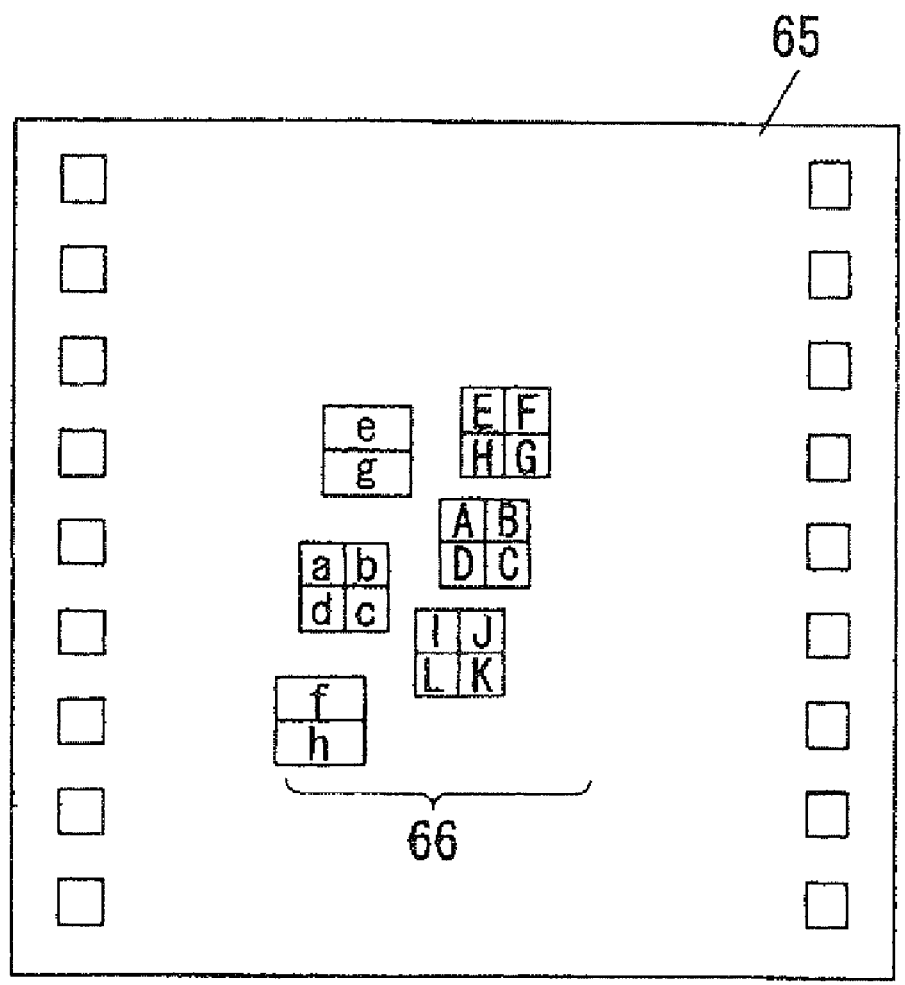
FIG. 6 is a schematic layout of optical receiving sections of an optical receiver of the second embodiment of the present invention.
Figure 7:
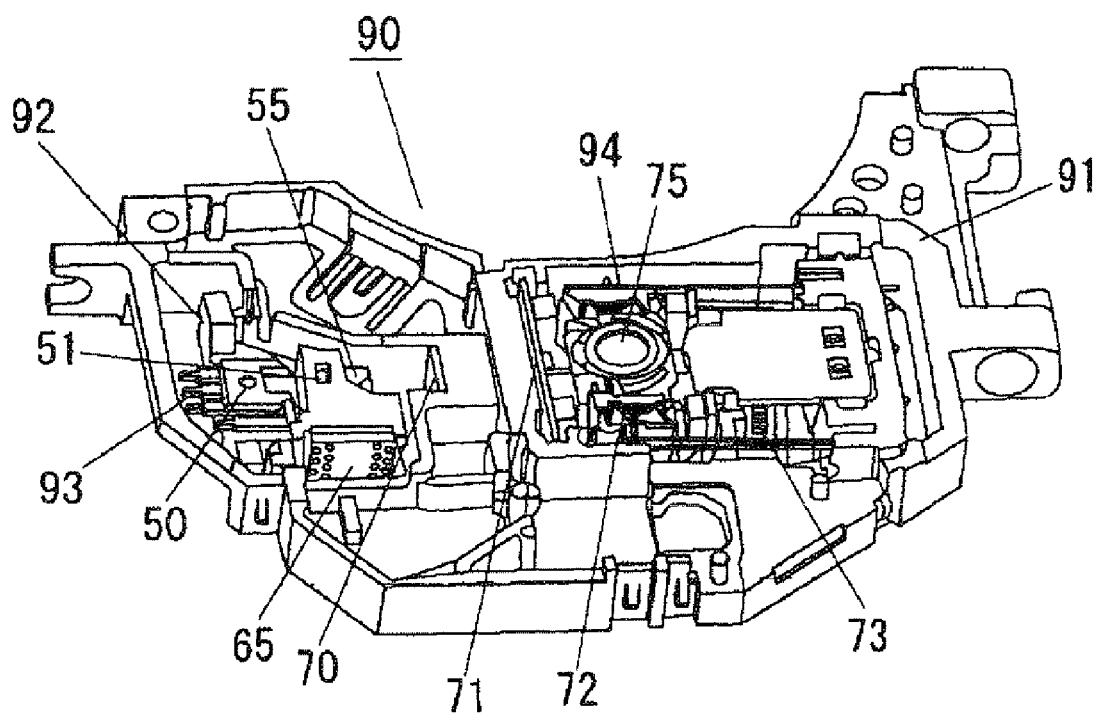
FIG. 7 is a schematic diagram of the optical pickup device of the second embodiment of the present invention.

A second embodiment is described by reference to the drawings. FIG. 5A is a schematic diagram of an optical system of an optical pickup device of the second embodiment, and FIG. 5B is a cross-sectional schematic view of an astigmatism generation element of the second embodiment. FIG. 6 is a layout drawing of an optical receiving section of an optical receiver of the second embodiment, and FIG. 7 is a schematic diagram of the optical pickup device of the second embodiment.

An optical pickup device 90 of the second embodiment corresponds to a mode in which two light beams having different wavelengths enter an astigmatism generation element 60. First, the optical pickup device 90 of the second embodiment is briefly described.

A light source 50 emits light toward an optical disk 80. An objective lens 75 converges outgoing light 81 from the light source 50 on the optical disk 80. An optical receiver 65 receives reflected light 82 resulting from the outgoing light 81 passing through the objective lens 75 after undergoing reflection on the optical disk 80. The astigmatism generation element 60 is interposed between the objective lens 75 and the optical receiver 65 and generates light for focus control purpose that produces focal points in front of and behind the optical receiver 65 and within two mutually orthogonal cross-sectional planes including an optical axis of the reflected light 82. The astigmatism generation element 60 is a Fresnel mirror 61 that has a plurality of orbicular zones 62 and steps 63 for connecting to the adjacent orbicular zones 62 to each other and that takes the orbicular zones 62 as a reflecting mirrors. A depth d1 of the innermost orbicular zone 62 of the orbicular zones 62 is made larger than a depth "d" of the steps 63. In the second embodiment, the light source 50 emits light having a wavelength λ1 and light having a wavelength λ2 that is longer than the wavelength λ1. The present embodiment is characterized in that the depth "d" of the steps 63 in the astigmatism generation element 60 where the light having the wavelength λ1 and the light having the wavelength λ2 enter is set to five-eighths times or less the wavelength λ1 and three-eighths times or more the wavelength λ2.

The depth "d" of the steps 63 is set to five-eighths times or less the wavelength λ1 and three-eighths times or more the wavelength λ2, whereby the depth "d" of the steps 63 satisfies at the wavelength λ1 three-eighths times or more the wavelength λ1 and five-eights or less the wavelength λ1, as well as satisfying at the wavelength λ2 three-eighths times or more the wavelength λ2 and five-eighths times or less the wavelength λ2. The influence of interference induced by the steps 63 is not so great at the wavelength λ2 as well as at the wavelength λ1, and hence the optical pickup can be used.

Moreover, as in the case of the first embodiment, the proportion of light that does not travel in predetermined directions as a result of being shaded by the steps 63 is minimum among proportions of light achieved by the depths "d" at which the influence of interference is not so great. Further, the depth d1 of the innermost orbicular zone 62 is made larger than the depth "d" of the steps 63, whereby the step 63 located immediately outside of the innermost orbicular zone 62 can be placed at a much outer location. Therefore, the steps 63 can be separated from a center area where the influence of the steps on the servo characteristic is great. The influence of the steps 63 of the astigmatism generation element 60 made up of the Fresnel mirror 61 can be lessened both at the wavelength $\lambda 1$ and the wavelength $\lambda 2$, so that a superior servo characteristic can be exhibited.

The optical pickup device 90 of the second embodiment will now be described further in detail. The light source 50 emits a laser beam for a DVD having a wavelength $\lambda 1=650$ nm and a laser beam for a CD having a wavelength $\lambda 2=780$ nm toward the optical disk 80. The outgoing light 81 emitted from the light source 50 is diffused light. In the second embodiment, the light source 50 is embodied as a single light source unit that emits the light having the wavelength $\lambda 1$ and the light having the wavelength $\lambda 2$ from positions closely proximate to each other. However, the light source 10 that emits the light having the wavelength $\lambda 1$ and the light source 50 that emits the light having the wavelength $\lambda 2$ may also be provided separately from each other.

An integrated prism 55 and the integrated prism 40 are identical with each other in terms of a fundamental configuration and a fabrication method, and the explanations about the integrated prism 40 are quoted. In the integrated prism 55, a beam splitter 58 corresponding to the beam splitter 46 is arranged on an oblique surface 56 corresponding to the oblique surface 44 of the integrated prism 40. In the integrated prism 55, the astigmatism generation element 60 corresponding to the astigmatism generation element 20 is arranged on an oblique surface 57 corresponding to the oblique surface 45 of the integrated prism 40. The astigmatism generation element 60 is made up of a Fresnel mirror 61.

The beam splitter 58 permits passage of the light with the wavelength $\lambda 1$ and the light with the wavelength $\lambda 2$ which have been emitted from the light source 50 toward the optical disk 80. The light with the wavelength $\lambda 1$ and the light with the wavelength $\lambda 2$ are reflected by the optical disk 80, to thus travel toward an optical receiver 65.

The light with the wavelength $\lambda 1$ and the light with the wavelength $\lambda 2$, which have undergone reflection on the optical disk 80, enter the astigmatism generation element 60, where they are reflected toward the optical receiver 65. Therefore, the depth "d" of the steps 63 of the astigmatism generation element 60 made up of the Fresnel mirror 61 and the depth d1 of the innermost orbicular zone 62 of the orbicular zones 62 must also be made compliant with the light having the wavelength $\lambda 1$ and the light having the wavelength $\lambda 2$.

The objective lens 75 converts the outgoing light 81 into convergent light, to thus converge the convergent light on the optical disk 80. Further, the objective lens also converts the light 82 reflected from the optical disk 80 into convergent light so as to converge the convergent light on the optical receiver 65. The objective lens 75 acts on the two laser beams having the wavelength $\lambda 1$ and the wavelength $\lambda 2$.

As in the case of the optical receiver 25, the optical receiver 65 has optical receiving sections that are arranged in the shape of a four-paned window on a surface of the optical receiver 65 by way of which the reflected light 82 enters. The optical receiver 65 is interposed between the front focal point and the rear focal point generated by the astigmatism generation element 60.

The depth "d" of the steps 63 of the Fresnel mirror 61 is determined in consideration of wavelengths $\lambda 1$ and $\lambda 2$ of the incoming light, a refractive index $\eta$ of the medium through which light passes, and an incident angle $\theta$. Specifically, an ideal depth "d" is substantially one-half of the wavelength $\lambda 1$ and one-half of the wavelength $\lambda 2$. Accordingly, as in the case of the first embodiment, when the depth "d" fulfills three-eighths times or more and five-eighths times or less the wavelength $\lambda 1$ and three-eighths times or more and five-eighths times or less the wavelength $\lambda 2$, both the light having the wavelength $\lambda 1$ and the light having the wavelength $\lambda 2$ can be used under not-so-great influence of interference. Influence resulting from the steps 63 throwing a shade on light can be minimized. The depth "d" fulfilling three-eighths times or more and five-eighths times or less the wavelength $\lambda 1$ and three-eighths times or more and five-eighths times or less the wavelength $\lambda 2$ is synonymous with the depth "d" fulfilling five-eighths times or less the wavelength $\lambda 1$ and three-eighths times or more the wavelength $\lambda 2$.

Let $\lambda 1=0.65$ μm, a refractive index $\eta$ of BK-7=1.51, and an incident angle $\theta=45°$, five-eighths times or less the wavelength $\lambda 1$ corresponds to a depth "d"=0.38 μm or less. Let $\lambda 2=0.78$ μm, a refractive index of BK-7=1.51, and an incident angle $\theta=45°$, three-eighths times or more the wavelength $\lambda 2$ corresponds to a depth "d"=0.27 μm or more. Specifically, when $0.27$ μm$\leq$d$\leq$0.38 μm is satisfied, the influence of interference is not so great, and the light can be used while influence resulting from the steps 63 throwing a shadow on light is minimized. In consideration of the fabrication method, it is preferable that the depth of the entire Fresnel mirror 61; namely, the depth d1 of the innermost orbicular zone 62 of the orbicular zones 62, be set to 0.3 μm or more.

The depth d1 of the innermost orbicular zone 62 of the orbicular zones 62 is preferably set to the wavelength $\lambda 2$ or less. The reason for this is to prevent light reflected from the astigmatism generation element 60 made up of the Fresnel mirror 61 from causing interference.

The optical pickup device 90 of the second embodiment further has, as an optical system, a diffraction element 51, a wavelength plate 70, a collimator lens 71, an upwardly directing mirror 72, and an optical receiver 73.

The diffraction element 51 has a first diffraction grating 52 and a second diffraction grating 53 in series. The first diffraction grating 52 is a diffraction grating for a DVD and separates light for a DVD having the wavelength $\lambda 1$ into three luminous fluxes by means of diffraction and permits light for a CD having the wavelength $\lambda 2$ to pass as it is. The second diffraction grating 53 is a diffraction grating for a CD and permits passage of the light having the wavelength $\lambda 1$ as it is and separates the light having the wavelength $\lambda 2$ into three luminous fluxes by means of diffraction. The thus-separated luminous fluxes are used for tracking control. The diffraction element 51 may have only the first diffraction grating 52 or the second diffraction grating 53 and be interposed between the light source 10 and the integrated prism 40 of the optical system in the optical pickup device of the first embodiment.

The wavelength plate 70 converts the outgoing light 81, which is P-polarized light, into circularly-polarized light and converts the reflected light 82, which is circularly polarized light, into S-polarized light. So long as the beam splitter 56 is configured so as to permit passage of P-polarized light and reflect S-polarized light, the beam splitter 56 can be caused to perform its operation. It is desirable that the wavelength plate 70 be interposed between the integrated prism 40 and the objective lens 15 of the optical system in the optical pickup device of the first embodiment.

The collimator lens 71 converts the outgoing light 81, which is divergent light, from the light source 50 into collimated light, as well as converting the reflected light 82, which is collimated light, from the optical disk 80 into convergent light. The collimator lens 71 may also be interposed between the integrated prism 40 and the objective lens 15 of the optical system in the optical pickup device of the first embodiment.

The upwardly directing mirror 72 is a mirror for changing the direction of the outgoing light 81, which is substantially parallel to a surface of the optical disk 80, to a direction substantially perpendicular to the surface of the optical disk 80. The upwardly directing mirror 72 may also be a prism. It is preferable to place the upwardly directing mirror 72 immediately in front of the objective lens 15 of the optical system in the optical pickup device of the first embodiment.

Of the outgoing light 81 from the light source 50, a portion of the light not traveling toward the optical disk 80 directly enters the optical receiver 73 without passing through the optical disk 80. The light entered the optical receiver 73 is output after being converted into an electric signal, and an output electrical signal is used for controlling an output of the outgoing light 81 from the light source 50. It is desirable that the optical receiver 73 be arranged at a position, in the optical system of the optical pickup device of the first embodiment, where the portion of the outgoing light 81 from the light source 50 not traveling toward the optical disk 80 directly enters without passing through the optical disk 80.

As shown in FIG. 6, optical receiving sections 66A to 66L and 66a to 66h are arranged on a light-receiving surface of the optical receiver 65. Light for a DVD having the wavelength $\lambda 1$ enters the optical receiving sections 66A to 66L. Light for a CD having the wavelength $\lambda 2$ enters the optical receiving sections 66a to 66h. Of the three luminous fluxes generated by the first diffraction grating 52, the center $0^{th}$-order luminous flux enters the optical receiving sections 66A to 66D, and either of the $\pm 1^{st}$-order luminous fluxes on both sides of the center luminous flux enters the optical receiving sections 66E to 66G and 66I to 66L. Of the three luminous fluxes generated by the second diffraction grating 53, the center $0^{th}$-order luminous flux enters the optical receiving sections 66a to 66d, and either of the $\pm 1^{st}$-order luminous fluxes on both sides of the center luminous flux enters the optical receiving sections 66e, 66g, 66f, and 66h.

Electric signals for a DVD into which the luminous flux entered the optical receiving sections 66A, 66B, 66C, 66D, 66E, 66F, 66G, 66H, 66I, 66J, 66K, and 66L of the optical receiver 65 are converted are taken as A, B, C, D, E, F, G, H, I, J, K, and L. Electric signals for a CD into which the luminous flux entered the optical receiving sections 66a, 66b, 66c, 66d, 66e, 66f, 66g, and 66h of the optical receiver 65 are converted are taken as "a," "b," "c," "d," "e," "f," "g," and "h".

A focus error signal FES for a DVD is FES=(A+C)−(B+D) for a DVD-ROM and a DVD±R/RW, FES={(A+C)−(B+D)}+Kt×{(E+I+G+K)−(H+L+F+J)} for a DVD-RAM, where Kt is a constant determined according to operation settings.

A focus error signal FES for a CD is FES=(a+c)−(b+d) for a CD-R/RW/ROM.

A tracking error signal TES for a DVD is TES=ph(A, D)−ph(B, C) for a DVD-ROM, and TES={(A+B)−(C+D)}−Kt×{(E+I+F+J)−(G+K+H+L)} for a DVD±R/RW and a DVD-RAM. In the equations, ph(X,Y) denotes a voltage into which a detected phase difference between X and Y is converted. The tracking error signal TES is a signal representing a displacement of a track of a spot.

A tracking error signal TES for a CD is TES={(a+b)−(c+d)}−Kt×{(e+f)−(g+h)} for a CD-R/RW/ROM and TES=ph(a, d)−ph(b, c) for a CD-ROM. A former method that enables more stable performance of tracking control is usually used. However, for instance, when an inferior disk, such as a CD-ROM having pits whose depth does not conform to standards, is subjected to data reproduction, it may be the case where a tracking error signal TES will not properly output under the former method. Even in such a case, the tracking error signal TES can properly be output under a latter method, and hence the method can be used as a backup tracking control method. Even when an inferior non-conforming disk that cannot undergo tracking control is subjected to data reproduction, tracking control becomes possible; hence, the optical pickup device can address, as an optical disk device, a wider spectrum of optical disks 80.

In FIG. 7, the optical pickup device 90 has a configuration in which respective components of the optical system are mounted on a base 91 directly or by way of other components. The base 91 is a framework of the optical pickup device 90. The base 91 is made of an alloy material, such a Zn alloy and a Mg alloy, or a hard resin material. An alloy material that easily assures rigidity is desirable. Mount sections for arranging various types of components are provided at predetermined locations on the base 91.

The light source 50, the diffraction element 51, the integrated prism 55, and the optical receiver 65 are fastened to a joint base 92, thereby making up a laser module 93. The joint base 92 is fixed to the base 91. The joint base 92 is made of; for instance, an alloy material exhibiting a high thermal conductivity and great rigidity. The objective lens 75 is carried by an objective lens drive section 94 that drives the objective lens 75, and the objective lens drive section 94 is secured to the base 91. The objective lens 75 is actuated in both a focusing direction and a tracking direction by means of the objective lens drive section 94. The wavelength plate 70, the collimator lens 71, the upwardly directing mirror 72, and the optical receiver 73 are secured to the base 91 directly or by way of other mount members.

Third Embodiment

Figure 8:
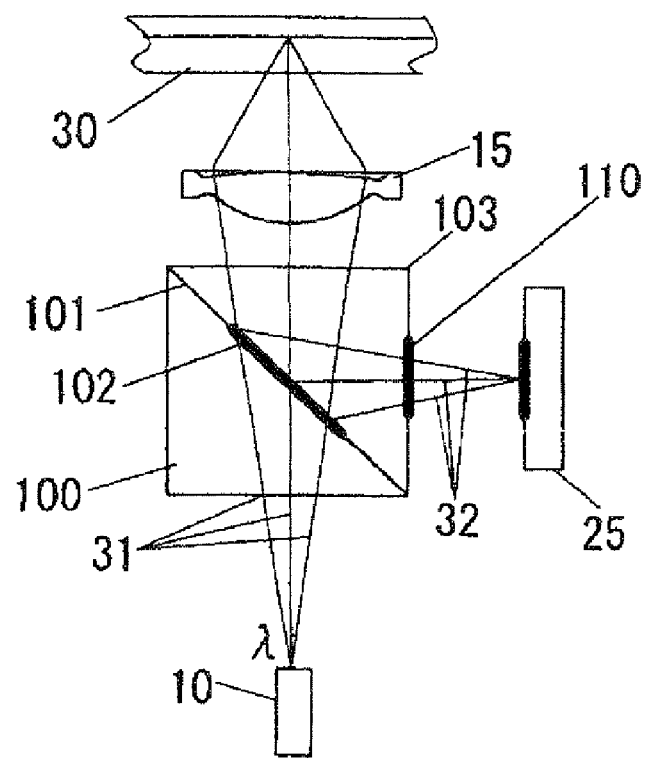
FIG. 8A is a schematic diagram of an optical system in an optical pickup device of a third embodiment of the present invention.
FIG. 8B is a cross-sectional schematic view of an astigmatism generation element of the third embodiment of the present invention.
Figure 8:
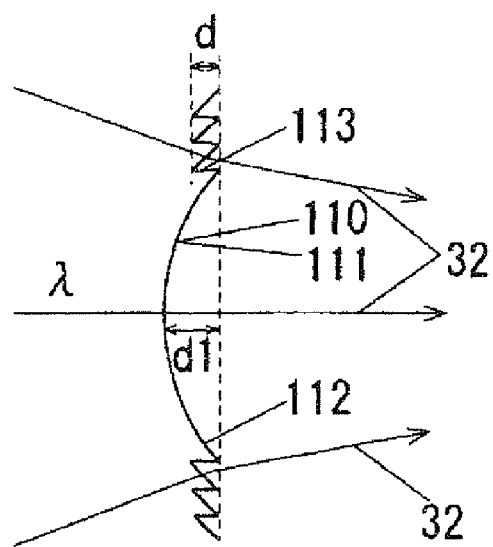
Figure 9:
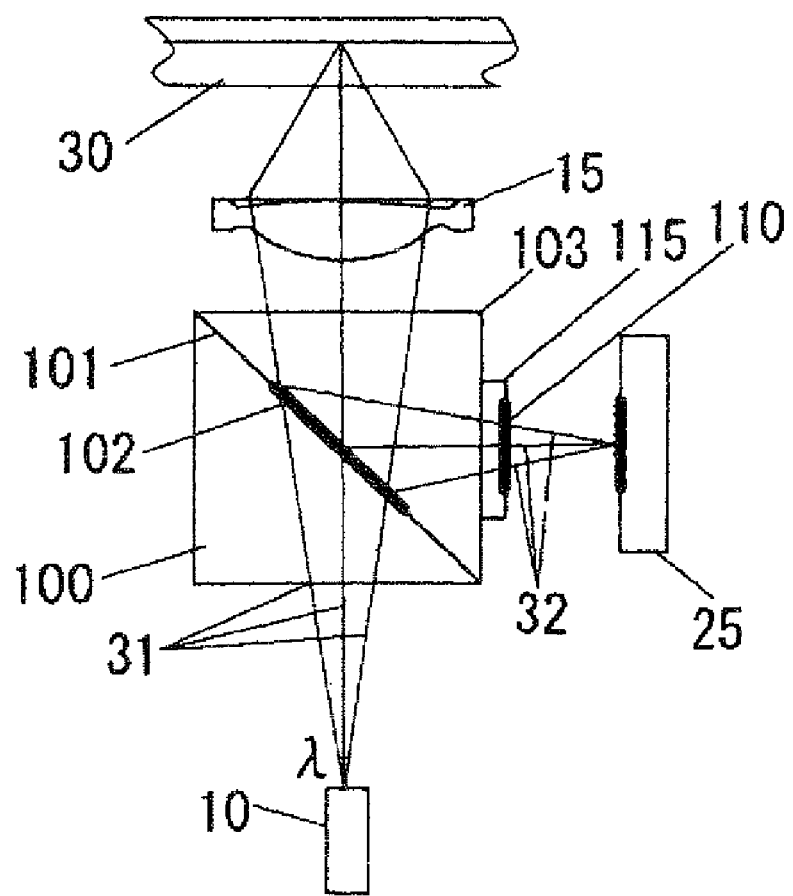
FIG. 9 is a schematic diagram of another example of the optical system in the optical pickup device of the third embodiment of the present invention.

A third embodiment will be described by reference to the drawings. FIG. 8A is a schematic diagram of an optical system of an optical pickup device of the third embodiment, and FIG. 8B is a cross-sectional schematic diagram of an astigmatism generation element of the third embodiment. FIG. 9 is a schematic diagram of another example optical system of the optical pickup device of the third embodiment. In the third embodiment, an astigmatism generation element 110 of the third embodiment is a Fresnel lens 111 rather than a Fresnel mirror.

In FIG. 8A, the light source 10, the objective lens 15, the optical receiver 25, and the optical disk 30 of the third embodiment are the same as those described in connection with the first embodiment. Only a difference between the present embodiment and the first embodiment lies in that the integrated prism 40 is changed to a prism 100. An oblique surface 101 is provided in the prism 100, and the beam splitter 102 is arranged on the oblique surface 101. The beam splitter 102 is identical with the beam splitter 46, and its explanation is employed. An astigmatism generation element 110 is provided on a surface 103 of the prism 100 facing the optical receiver 25. As shown in FIG. 9, the astigmatism generation element 110 may also be arranged on a transparent substrate 115, and the substrate 115 may also be arranged on the surface 103.

The astigmatism generation element 110 of the optical pickup device of the third embodiment is a Fresnel lens 111 that has a plurality of orbicular zones 112 and steps 113 that connect adjacent orbicular zones 112 to each other and that takes the orbicular zones 112 as a lens. The astigmatism generation element of the present embodiment is characterized in that a depth "d" of the steps 113 is set substantially equal to a wavelength λ and that the depth d1 of the innermost orbicular zone 112 of the orbicular zones 112 is made greater than the depth "d" of the steps 113. The depth "d" of the steps 113 is determined in consideration of a wavelength λ of incoming light, a refractive index η of a medium through which light passes, and an incident angle θ.

The depth "d" of the step 113 substantially equal to the wavelength λ is the minimum one of dimensions at which a difference between an optical path of light passing through higher portions of the step 113 and an optical path of light passing through lower positions of the step 113 is substantially a natural-number multiple of the wavelength λ and at which a phase difference does not arise. Therefore, the influence of the steps 113 attributable to a phase difference is minimum, and a proportion of light that does not travel in a predetermined direction as a result of being shaded by the steps 113 is also minimum. Moreover, a depth d1 of the innermost orbicular zone 112 is made larger than the depth "d" of the steps 113, whereby the step 113 located immediately outside the innermost orbicular zone 112 can be arranged at a much outer position. Therefore, the steps 113 can be arranged at positions spaced apart from the neighborhood of the center where influence on a servo characteristic is great. Therefore, the influence of the steps 113 in the astigmatism generation element 110 made up of the Fresnel lens 111 can be lessened, so that a superior servo characteristic can be exhibited.

In the case of the Fresnel lens 111, the depth "d" of the steps 113 is determined in consideration of the wavelength λ, of incoming light, a refractive index η of a medium through which light passes, and an incident angle θ. In consideration of the refractive index η of the medium and the incident angle θ, we have $d=n\lambda/(\eta-1)\cos\theta$. The depth "d" of the steps 113 is a depth "d" that takes into account the wavelength λ of incoming light, the refractive index η of the medium through which light passes, and the incident angle θ. Let the minimum natural number n=1, then $d=\lambda/(\eta-1)\cos\theta$. Namely, the depth "d" of the steps 113 becomes equal to the wavelength λ. For instance, let a wavelength λ=0.78 μm which is a wavelength for a CD, a refractive index η of BK-7=1.51, and an incident angle θ=0°, then "d"=1.53 μm. Let a wavelength λ=0.65 μm which is a wavelength for a DVD, a refractive index of BK-7 η=1.51, and an incident angle θ=0°, then "d"=1.27 μm.

In the third embodiment, the best depth "d" of the steps 113 of the Fresnel lens 111 is described as the wavelength λ. However, in reality, it is difficult to set the depth precisely to the wavelength λ because of production errors, and the like.

When the depth "d" is one-half times or three-seconds times the wavelength λ, the phase difference comes to 180°, and interference is maximized, so that the Fresnel lens 111 does not function at all. It is considered that the Fresnel lens 111 acts when the phase difference falls within a range from 0° to 90° or a range from 270° to 360°, and the depth "d" corresponding to the respective phase differences is three-quarters times to five-quarters times the wavelength λ. Specifically, so long as the depth "d" of the steps 113 of the Fresnel lens 111 is three-quarters times to five-quarters times the wavelength λ, the Fresnel lens can be used under not-so-great influence of interference.

Specifically, let a wavelength λ=0.78 μm, a refractive index η=1.51, and an incident angle θ=0°, then 1.15≦d≦1.91 μm. Let a wavelength λ=0.65 μm, then 0.96≦d≦1.59 μm. Since the respective values of the depths "d" fall within a range from 0.3 to 2.0 μm, a superior geometry for the orbicular zones 112 and a superior geometry for the steps 113 are obtained.

The depth d1 of the innermost orbicular zone 112 among the orbicular zones 112 is set so as to become greater than the depth "d" of the steps 113, whereby the area of the innermost orbicular zone 112 is made larger, so that the steps 113 can be arranged as outside as possible. Therefore, the reflected light 32 enters the smaller number of steps 113 and can be prevented from entering the steps 113 from the center up to an outer area of the Fresnel lens. Consequently, the influence of the steps 113 becomes smaller.

In the third embodiment, the depth d1 of the innermost orbicular zone 112 of the orbicular zones 112 is made larger than the depth "d" of the steps 113. It is desirable that the depth d1 be set to twice or less the wavelength λ of the reflected light 32. The reason for this is that the light 32 reflected from the astigmatism generation element 110 made up of the Fresnel lens 111 does not cause interference.

When light having the wavelength λ1 and light having the wavelength λ2 enter the astigmatism generation element 110 made up of the Fresnel lens 111 as in the case with the astigmatism generation element 60 made up of the Fresnel mirror 61 described in connection with the second embodiment, the followings are achieved. Specifically, the depth d1 of the steps 113 should be set to five-quarters times or less the wavelength λ1 and three-quarters times or more the wavelength λ2. For instance, in the case of the wavelength λ1=0.65 μm, the wavelength λ2=0.78 μm, the refractive index η=1.51, and the incident angle θ=0°, we have 1.15 μm≦d≦1.59 μm.

The depth "d" of the steps 113 is set to five-quarters times or less the wavelength λ1 and three-quarter times or more the wavelength λ2, whereby the depth "d" of the steps 113 satisfies at the wavelength λ1 three-quarters times or more and five-quarters times or less the wavelength λ1 as well as satisfying at the wavelength λ2 three-quarters times or more and five-quarters times or less the wavelength λ2. Therefore, the influence of interference exerted by the steps 113 is not so great at both the wavelength λ1 and the wavelength λ2, and hence the astigmatism generation element can be used. Moreover, a proportion of light that fails to travel in a predetermined direction as a result of being shaded by the steps 113 is minimum among the depths "d" at which the influence of interference is not so great, as in the first embodiment. Moreover, the depth d1 of the innermost orbicular zone 112 is made larger than the depth "d" of the steps 113, whereby the step 113 located immediately outside the innermost orbicular zone 112 can be arranged at a much outer position. Therefore, the steps 113 can be arranged at positions spaced apart from the neighborhood of the center where influence on a servo characteristic is great. Therefore, the influence of the steps 113 in the astigmatism generation element 110 made up of the Fresnel lens 111 can be lessened at both the wavelength λ1 and the wavelength λ2, so that a superior servo characteristic can be exhibited. Since the respective values of the depths fall within a range from 0.3 to 2.0 μm, a superior geometry for the orbicular zones 112 and a superior geometry for the steps 113 are obtained.

It is desirable that the depth d1 of the innermost orbicular zone 112 of the orbicular zones 112 be set to twice or less the wavelength λ2. The reason for this is that the light 32 reflected from the astigmatism generation element 110 made up of the Fresnel lens 111 does not cause interference.

Fourth Embodiment

Figure 10:
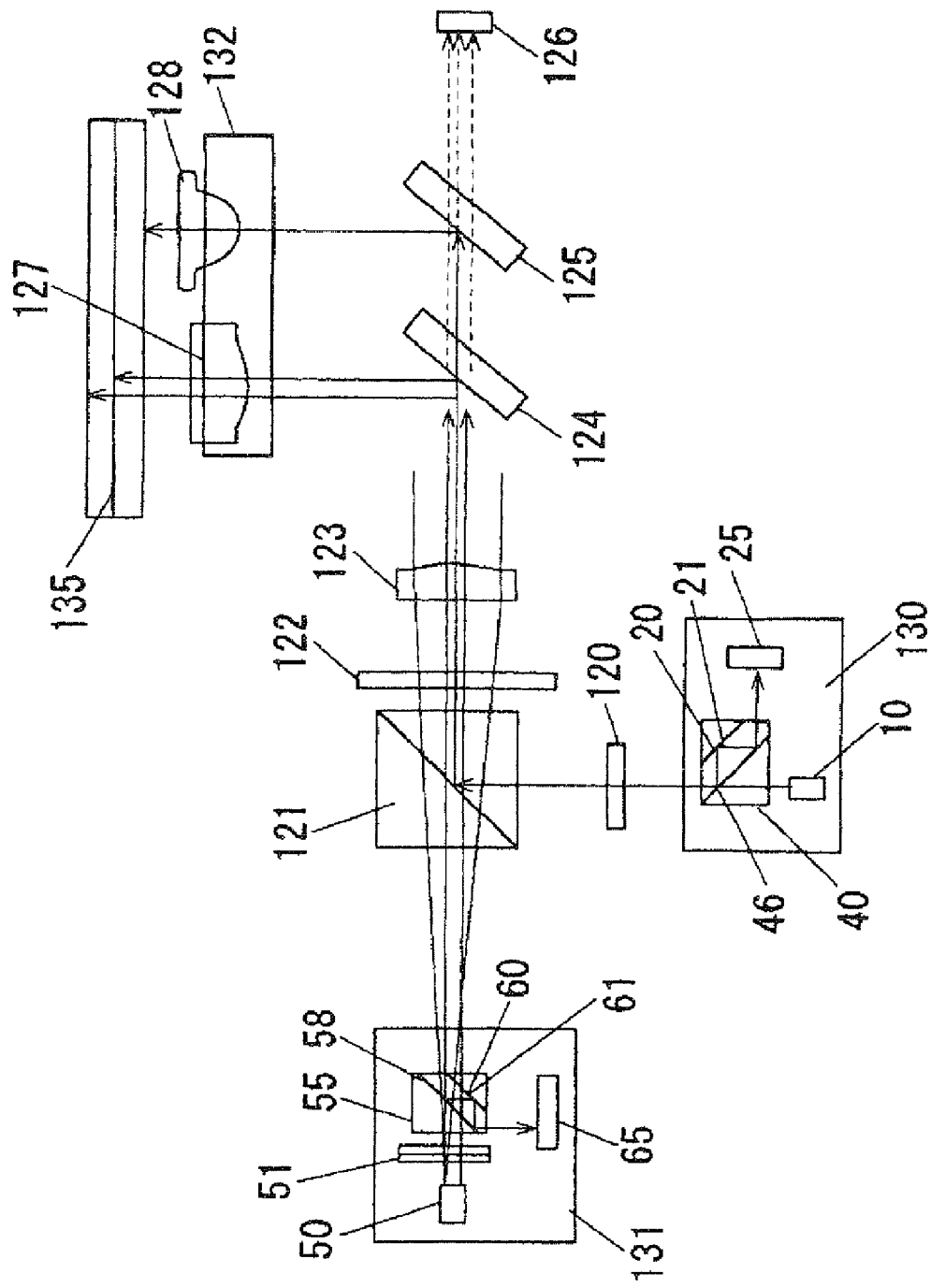
FIG. 10 is a schematic diagram of an optical system in an optical pickup device of a fourth embodiment of the present invention.

A fourth embodiment will now be described by reference to the drawings. FIG. 10 is a schematic diagram of an optical system in an optical pickup device of a fourth embodiment. The optical pickup devices of the first through third embodiments subject at least either a DVD or a CD to recording and reproduction. However, an optical pickup device of the fourth embodiment subjects a BD (Blu-ray Disc) to recording and reproduction, as well as subjecting a DVD and a CD to recording and reproduction.

The descriptions provided in connection with the first embodiment are quoted as descriptions about the light source 10, the integrated prism 40, the beam splitter 46, the astigmatism generation element 20 made up of the Fresnel mirror 21, and the optical receiver 25. The light source 10 is assumed to emit a laser beam for a BD having a wavelength $\lambda=405$ nm toward an optical disk 135 acting as a BD. The light source 10, the integrated prism 40, and the optical receiver 25 are made up as a light source module 130. A hologram 120 generates light used for controlling tracking operation of a BD by means of diffraction.

The descriptions provided in connection with the second embodiment are quoted as descriptions about the light source 50, the diffraction element 51, the integrated prism 55, the beam splitter 58, the astigmatism generation element 60 made up of the Fresnel mirror 61, and the optical receiver 65. The light source 50, the diffraction element 51, the integrated prism 55, and the optical receiver 65 are made up as a light source module 131.

A prism 121 is arranged as a beam splitter with a wavelength separation film laid on an internal oblique surface. The beam splitter enables passage of light for a DVD and light for a CD originated from the light source 50 and light for a DVD and a light for a CD reflected from an optical disk 135. The beam splitter also reflects light for a BD originated from the light source 10 and light for a BD reflected by the optical disk 135. Thus, the light for a DVD, the light for a CD, and light for a BD are separated from each other.

A wavelength plate 122 addresses three wavelengths and converts P-polarized light emitted from the light source 10 and the light source 50 into circularly-polarized light and converts the light reflected by the optical disk 135 into S-polarized light. A collimator lens 123 converts divergent light originated from the light sources 10 and 50 from circularly polarized light into substantially-collimated light. Conversely, substantially-collimated light reflected by the optical disk 135 into convergent light.

An upwardly directing mirror 124 reflects outgoing light for a DVD and outgoing light for a CD that are substantially parallel to the optical disk 135 so as to become substantially perpendicular to the optical disk 135 acting as a DVD or a CD. The upwardly directing mirror 124 lets a portion of the outgoing light for a DVD, a portion of the outgoing light for a CD, and outgoing light for a BD pass.

An upwardly directing mirror 125 reflects outgoing light for a BD that is substantially parallel to the optical disk 135 so as to become substantially perpendicular to the optical disk 135 acting as a BD. The upwardly directing mirror 125 lets a portion of the outgoing light for a BD, the outgoing light for a CD, and the outgoing light for a DVD pass.

An objective lens 127 converges the upwardly directed light for a DVD on the optical disk 135 acting as a DVD, as well as converging the upwardly directed light for a CD on the optical disk 135 acting as a CD. An objective lens 128 converges the light for a BD upwardly directed by the upwardly directing mirror 125 on the optical disk 135 acting as a BD. The objective lens 127 and the objective lens 128 are built into a single objective lens drive section 132.

An optical receiver 126 detects the light for a CD, the light for a DVD, and the light for a BD passed through the upwardly directing mirror 125, converts the thus-detected light into an electric signal, and outputs the resultant electric signal. The thus-output signal is used for controlling the quantity of light for a CD, the quantity of light for a DVD, and the quantity of light for a BD.

The depth "d" of the steps 23 that belongs to the astigmatism generation element 20 made up of the Fresnel mirror 21 and that is substantially one-half of the wavelength $\lambda$ for a BD is the minimum one of dimensions at which a difference between a roundtrip optical path of light passing through higher portions of the steps 23 and a roundtrip optical path of light passing through lower portions of the steps 23 is substantially a natural-number multiple of the wavelength $\lambda$ and at which a phase difference does not arise. Therefore, the influence of the steps 23 attributable to a phase difference is minimum, and a proportion of light that does not travel in a predetermined direction as a result of being shaded by the steps 23 is also minimum. Moreover, a depth d1 of the innermost orbicular zone 22 is made larger than the depth "d" of the steps 23, whereby the step 23 located immediately outside the innermost orbicular zone 22 can be arranged at a much outer position. Therefore, the steps 23 can be arranged at positions spaced apart from the neighborhood of the center where influence on a servo characteristic is great. Therefore, the influence of the steps 23 in the astigmatism generation element 20 made up of the Fresnel mirror 21 can be lessened, so that a superior servo characteristic can be exhibited.

The depth "d" of the steps 63 belonging to the astigmatism generation element 60 made up of the Fresnel mirror 61 is set to five-eighths times or less the wavelength $\lambda 1$ for a DVD and three-eighths times or more the wavelength $\lambda 2$ for a CD. As a result, the depth "d" of the steps 63 satisfies at the wavelength $\lambda 1$ three-eighths times or and five-eighths times or less the wavelength $\lambda 1$, as well as satisfying at the wavelength $\lambda 2$ three-eighths times or more and five-eighths times or less the wavelength $\lambda 2$. The influence of interference induced by the steps 63 is not so great at the wavelength $\lambda 2$ as well as at the wavelength $\lambda 1$, and hence the optical pickup can be used. Moreover, as in the case of the first embodiment, the proportion of light that does not travel in predetermined directions as a result of being shaded by the steps 63 is minimum among proportions of light achieved by the depths "d" at which the influence of interference is not so great. Further, the depth d1 of the innermost orbicular zone 62 is made larger than the depth "d" of the steps 63, whereby the step 63 located immediately outside of the innermost orbicular zone 62 can be placed at a much outer location. Therefore, the steps 63 can be separated from a center area where the influence of the steps 63 on the servo characteristic is great. The influence of the steps 63 of the astigmatism generation element 60 made up of the Fresnel mirror 61 can be lessened both at the wavelength $\lambda 1$ and the wavelength $\lambda 2$, so that a superior servo characteristic can be exhibited.

As mentioned above, the optical pickup device of the fourth embodiment makes it possible to lessen the influence of the steps 23 and 63 in the astigmatism generation elements 20 and 60 respectively made up of the Fresnel mirrors 21 and 61, in connection with any of a BD, a DVD, and a CD, thereby exhibiting a superior servo characteristic.

Fifth Embodiment

Figure 11:
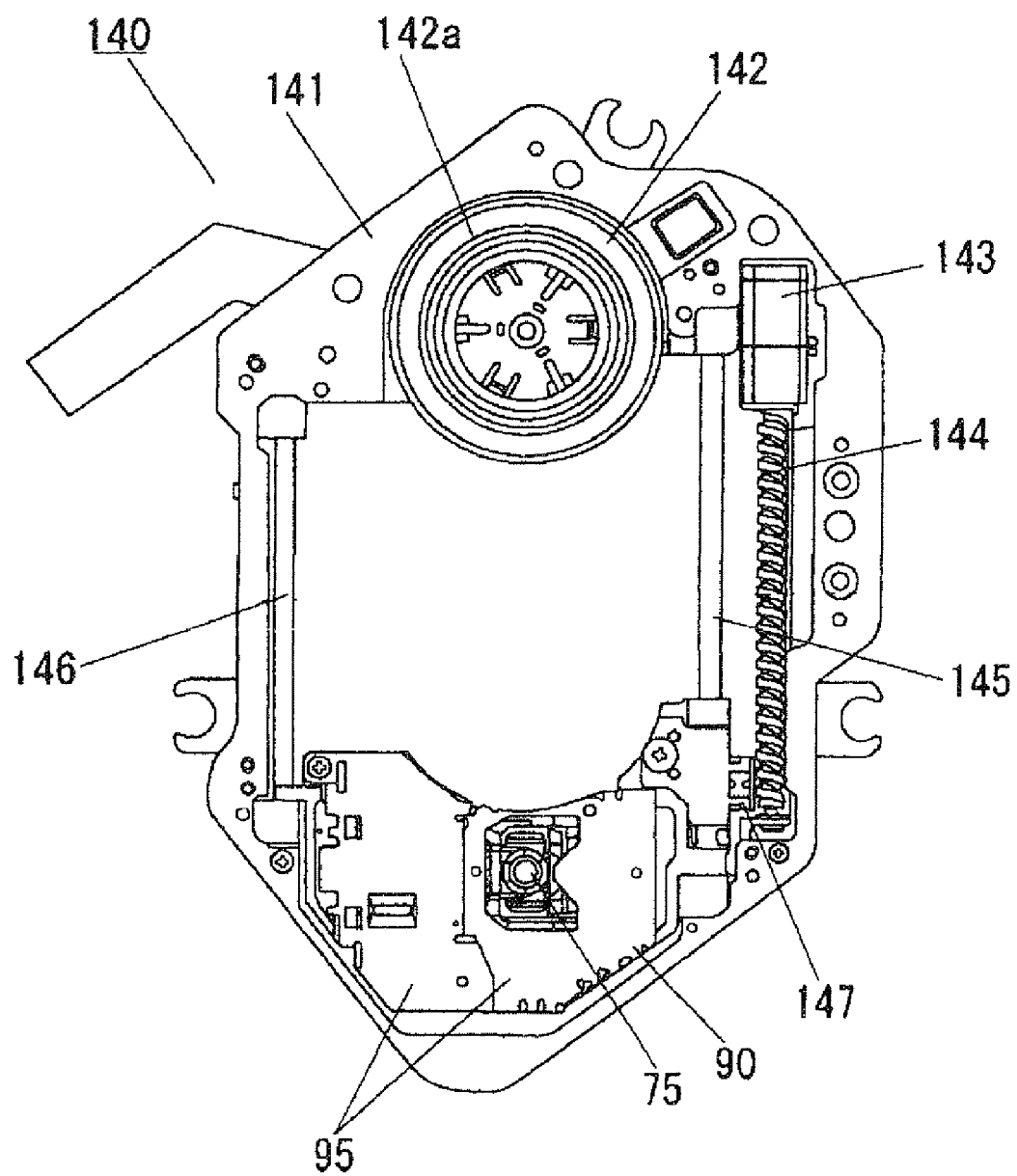
FIG. 11 is a schematic diagram of an optical pickup module in an optical disk drive of a fifth embodiment of the present invention.
Figure 12:
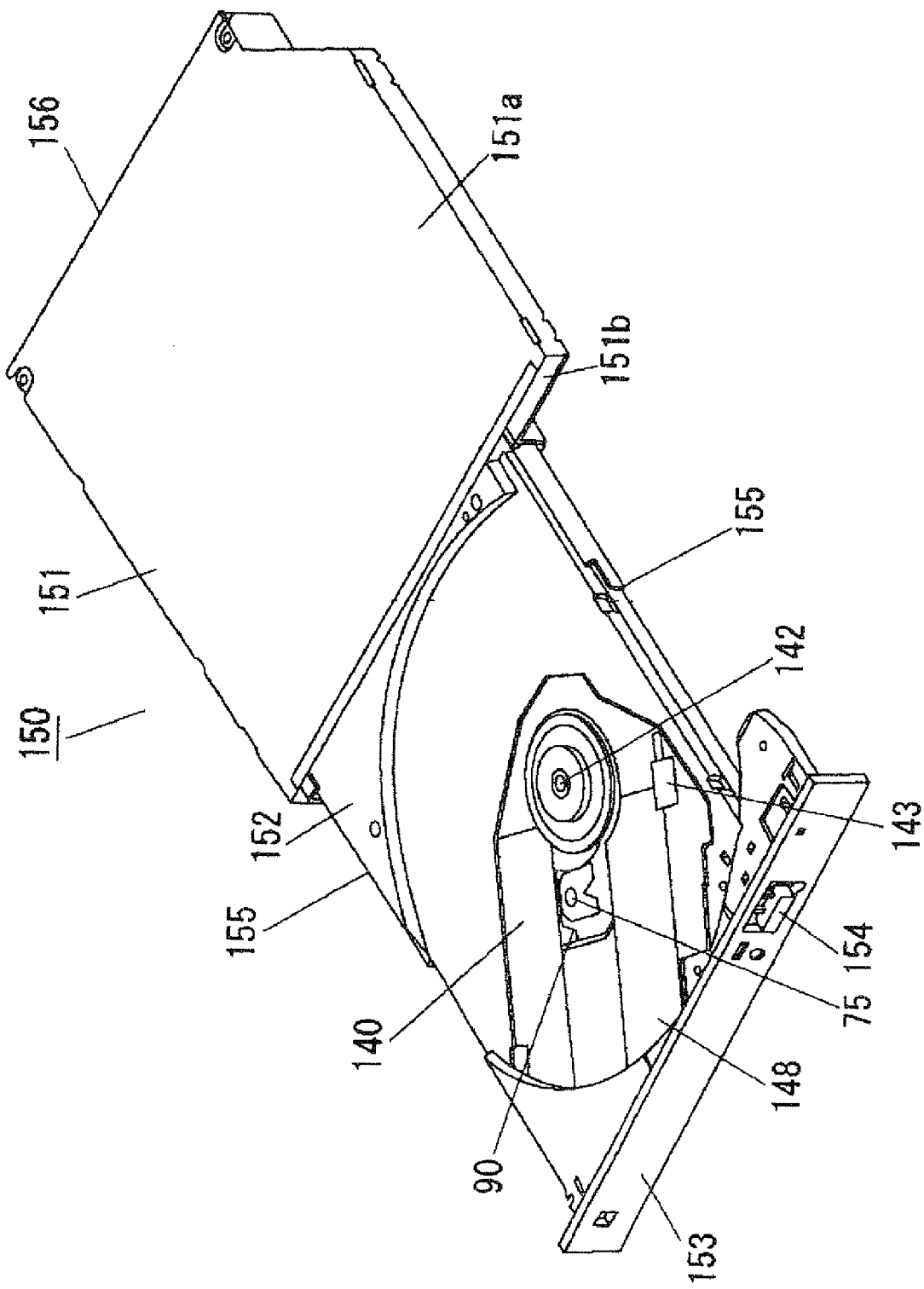
FIG. 12 is a schematic diagram of the optical disk drive of the fifth embodiment of the present invention.
Figure 13:
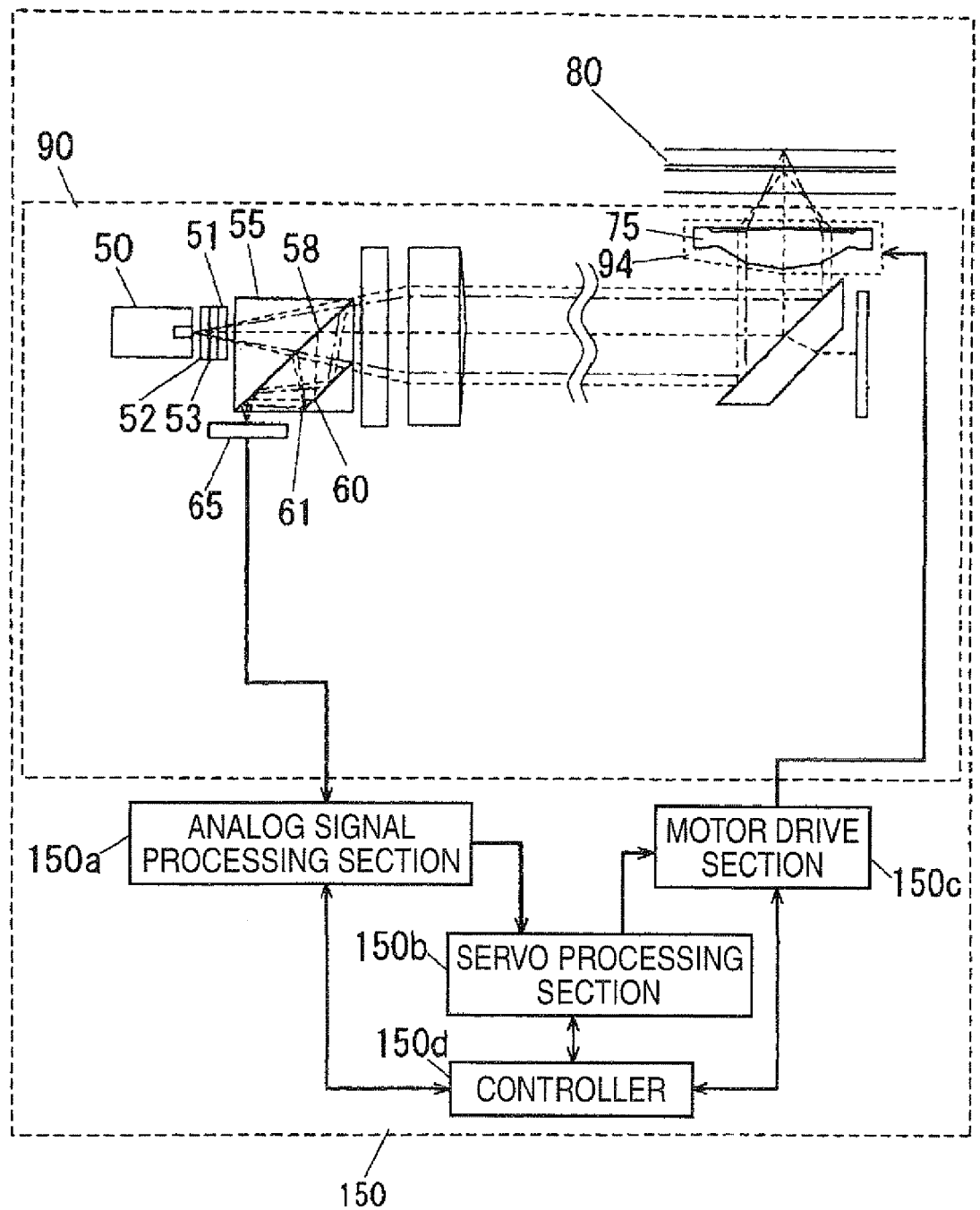
FIG. 13 is a view showing the flow of a servo in the optical disk drive of the fifth embodiment of the present invention.
Figure 14:
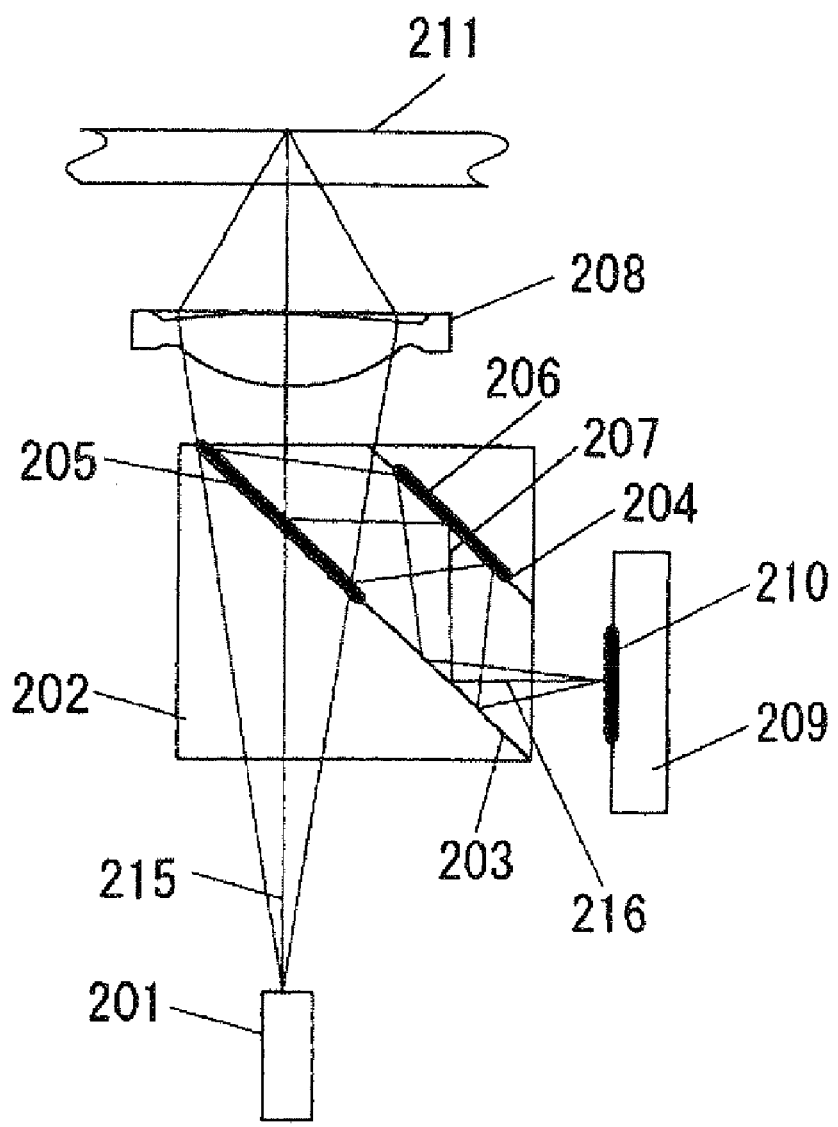
FIG. 14 is a schematic diagram of an optical system of a related-art optical pickup device.
Figure 15:
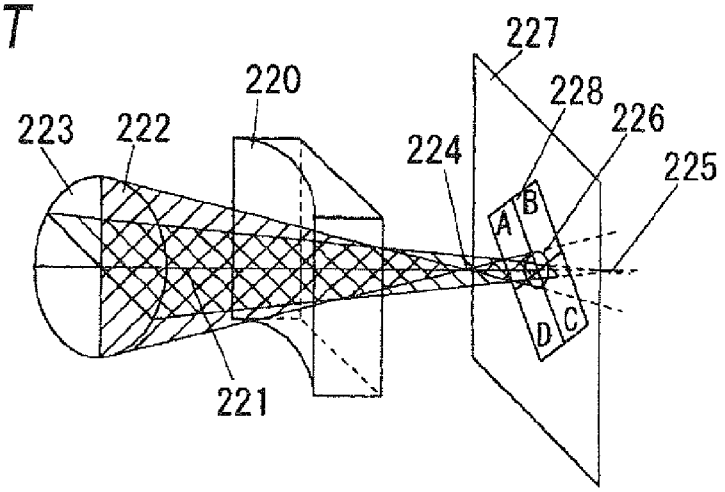
FIG. 15A is an operation diagram of a related-art astigmatism generation element.
FIG. 15B is a view showing the geometry of a beam spot achieved when an optical disk is located at a close position.
FIG. 15C is a view showing the geometry of the beam spot achieved when the optical disk is located at a distant position.
Figure 15:
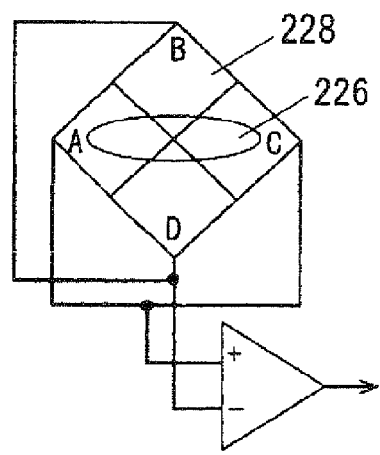
Figure 15:
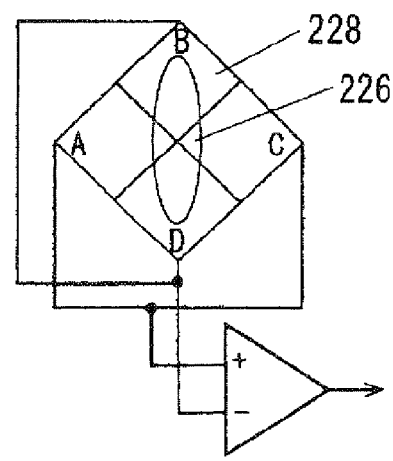
Figure 16:
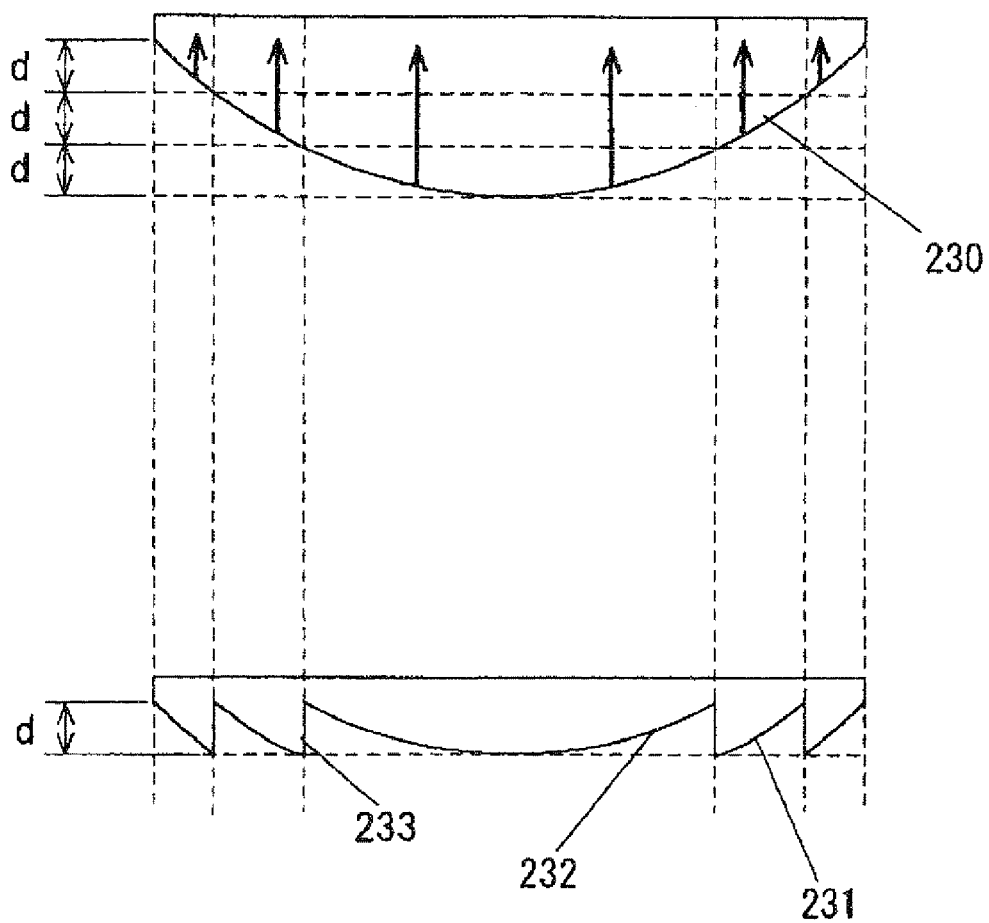
FIG. 16 is a cross-sectional view of an ordinary reflecting mirror and a Fresnel mirror.
Figure 17:
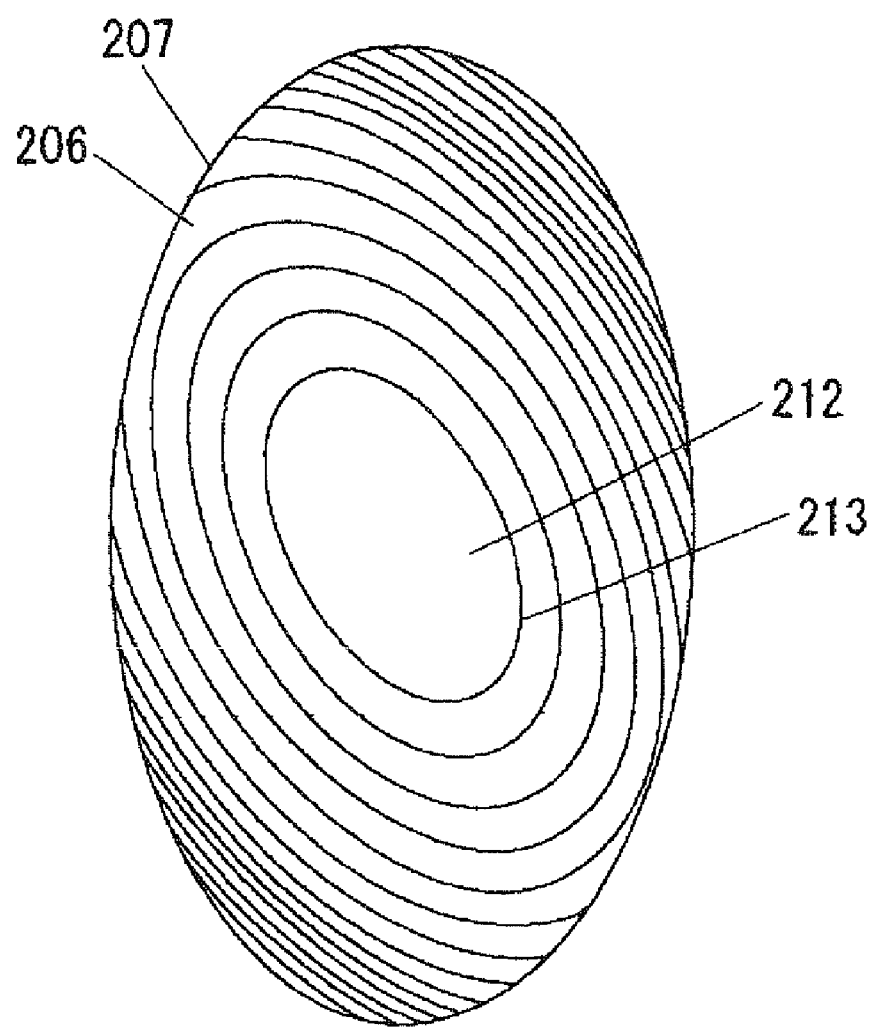
FIG. 17 is a plan view of a related-art astigmatism generation element made up of a Fresnel mirror.

A fifth embodiment is described by reference to the drawings. FIG. 11 is a schematic diagram of an optical pickup module in an optical disk drive of the fifth embodiment; FIG. 12 is a schematic diagram of the optical disk drive of the fifth embodiment; and FIG. 13 is a view showing the flow of servo in the optical disk drive of the fifth embodiment.

In FIG. 11, a drive mechanism of an optical disk drive 150 equipped with a rotary drive section for rotationally driving the optical disk 80 and a movement section for letting the optical pickup device 90 approach or depart from the rotary drive section is called an optical pickup module 140. A base 141 makes up a framework of the optical pickup module 140. The optical pickup module 140 is built by directly or indirectly placing various constituent components on the base 141.

The rotary drive section is equipped with a spindle motor 142 having a turn table 142a on which the optical disk 80 is to be positioned. The spindle motor 142 is secured on the base 141. The spindle motor 142 generates rotary drive force for rotating the optical disk 80.

The movement section is equipped with a feed motor 143, a screw shaft 144, a main shaft 145, and a sub-shaft 146. The feed motor 143 is fastened to the base 141. The feed motor 143 generates rotary drive force required for the optical pickup device 90 to move between an inner radius and an outer radius of the optical disk 80. A stepping motor, a DC motor, and the like, are used as the feed motor 143. The screw shaft 144 has a helical groove and linked to the feed motor 143 directly or by way of several stages of gears. In the fifth embodiment, the screw shaft 144 is linked directly to the feed motor 143. The main shaft 145 and the sub-shaft 146 are secured at their respective ends to the base 141 by way of a holding member. The main shaft 145 and the sub-shaft 146 support the optical pickup device 90 so as to be freely movable in a radial direction of the optical disk 80. The optical pickup device 90 is equipped with a rack 147 having guide teeth that mesh with the groove of the screw shaft 144. Since the rack 147 translates the rotational drive force of the feed motor 143 transmitted to the screw shaft 144 into linear drive force, the optical pickup device 90 can move between the inner radius and outer radius of the optical disk 80.

The rotary drive section is not limited to the configuration described in connection with the fifth embodiment, so long as the configuration enables rotation of the optical disk 80 at predetermined rotational speed. Further, the movement section is not limited to the configuration described in connection with the fifth embodiment, so long as the configuration enables movement of the optical pickup device 90 to a predetermined position between the inner radius and outer radius of the optical disk 80.

The optical pickup device 90 is described in connection with the second embodiment and embodied by providing the configuration shown in FIG. 7 with a cover 95. The optical pickup device 90 may also be replaced with the optical pickup device described in connection with the first embodiment or the optical pickup devices described in connection with the third and fourth embodiments.

The light source 50 belonging to the optical pickup device 90 emits light toward the optical disk 80. The objective lens 75 converges the outgoing light 81 from the light source 50 on the optical disk 80. The optical receiver 65 receives the reflected light 82 resulting from the outgoing light 81 passing through the objective lens 75 after undergoing reflection on the optical disk 80. The astigmatism generation element 60 is interposed between the objective lens 75 and the optical receiver 65 and generates light for focus control purpose that produces focal points in front of and behind the optical receiver 65 and within two mutually orthogonal cross-sectional planes including an optical axis of the reflected light 82. The astigmatism generation element 60 corresponds to the Fresnel mirror 61 that has the plurality of orbicular zones 62 and the steps 63 for connecting the adjacent orbicular zones 62 to each other and that takes the orbicular zones 62 as a reflecting mirrors. The depth d1 of the innermost orbicular zone 62 of the orbicular zones 62 is made larger than a depth "d" of the steps 63. The light source 50 emits the light having a wavelength λ1 and the light having a wavelength λ2 that is longer than the wavelength λ1. The optical pickup device 80 is characterized in that the depth "d" of the steps 63 in the astigmatism generation element 60 where the light having the wavelength λ1 and the light having the wavelength enter is set to five-eighths times or less the wavelength λ1 and three-eighths times or more the wavelength λ2.

The depth "d" of the steps 63 is set to five-eighths times or less the wavelength λ1 and three-eighths times or more the wavelength λ2, whereby the depth "d" of the steps 63 satisfies at the wavelength λ1 three-eighths times or more and five-eighths or less the wavelength λ1, as well as satisfying at the wavelength λ2 three-eighths times or more and five-eighths times or less the wavelength λ2. The influence of interference induced by the steps 63 is not so great at the wavelength λ2 as well as at the wavelength λ1, and hence the optical pickup can be used. Moreover, the proportion of light that does not travel in predetermined directions as a result of being shaded by the steps 63 is minimum among the proportions of light achieved by the depths "d" at which the influence of interference is not so great. Further, the depth d1 of the innermost orbicular zone 62 is made larger than the depth "d" of the steps 63, whereby the step 63 located immediately outside of the innermost orbicular zone 62 can be placed at a much outer location. Therefore, the steps 63 can be separated from a center area where the influence of the steps 63 on the servo characteristic is great. The influence of the steps 63 of the astigmatism generation element 60 made up of the Fresnel mirror 61 can be lessened both at the wavelength λ1 and the wavelength λ2, so that a superior servo characteristic can be exhibited.

An inclination of the main shaft 145 and an inclination of the sub-shaft 146 are adjusted, by means of an adjustment mechanism making up a retaining member, in such a way that a laser beam emitted from the objective lens 75 of the optical pickup device 90 enters the optical disk 80 at right angles.

In FIG. 12, a housing 151 of the optical disk drive 150 is configured by fixedly combining an upper housing 151a with a lower housing 151b through use of screws, or the like. A tray 152 is set in the housing 151 in a retractable fashion. A lower side of the optical pickup module 140 equipped with a cover 148 is put on the tray 152. The cover 148 has an opening through which the objective lens 75 of the optical pickup device 90 and a turntable 142a of the spindle motor 142 are exposed. Further, in the case of the fifth embodiment, the feed motor 143 is also exposed, thereby reducing the thickness of the optical pickup module 140. The tray 152 has an opening through which at least portions of the objective lens 75, the turn table 142a, and the cover 148 are exposed. A bezel 153 is provided on a front end face of the tray 152 and configured so as to close a retraction port of the tray 152 when the tray 152 is retracted in the housing 151. An ejection switch 154 is provided on the bezel 153. The tray 152 is disengaged from the housing 151 by pushing the ejection switch 154, whereby the tray 152 becomes retractable with respect to the housing 151. Rails 155 are slidably provided on the housing 151 as well as on both sides of the tray 152. Un-illustrated circuit boards are arranged in the housing 151 and the tray 152, and ICs of a signal processing system, power circuits, and the like, are mounted on the respective circuit boards. An external connector 156 is connected to power/signal lines provided in electronic equipment, such as a computer. Power is supplied to the inside of the optical disk drive 150 by way of the external connector 156, or an electric signal is led to the inside of the optical disk drive 150 from the outside by way of the external connector 156. Alternatively, an electronic signal generated by the optical disk drive 150 is sent to electronic equipment, or the like.

Flow of focus control and tracking control of the optical pickup device 90 are now described. In FIG. 13, the light for a DVD with the wavelength λ1 originated from the light source 50 and the outgoing light for a CD with the wavelength λ2 originated from the same are separated into beams used for tracking control respectively by means of the first diffraction grating 51 and the second diffraction grating 53 of the diffraction element 51. The thus-separated beams enter the optical disk 80. Light reflected from the optical disk 80 is separated into beams by the beam splitter 58 of the integrated prism 55, and the thus-separated beams are converted by the astigmatism generation element 60 that produce different focal points within two mutually orthogonal cross-sectional planes including an optical axis. The thus-converted beams enter the optical receiver 65. The laser beam passed through the astigmatism generation element 60 is used in focus control. The laser beam entered the optical receiver 65 is converted into electric signals for DVD focus control, CD focus control, DVD tracking control, and CD tracking control, and the thus-converted electric signals are delivered to an analogue signal processing section 150a provided on the un-illustrated circuit board of a main unit of the optical disk drive 150.

The analogue signal processing section 150a subjects the input signal to arithmetic processing and band processing, and outputs the processed signal to a servo processing section 150b. The servo processing section 150b produces a focus error signal FES and a tracking error signal TES from the signal from the analogue signal processing section 150a, and the thus-generated signals are output to a motor drive section 150c. The motor drive section 150c generates an electric current for driving the objective lens drive section 94 carrying the objective lens 75 from the input focus error signal FES and the tracking error signal TES. Control operation is thereby performed in such a way that displacement of a focal point of a luminous flux converged on the optical disk 80 and a displacement of the focal point from a track are minimized.

Moreover, the signals sent from the analogue signal processing section 150a, the servo processing section 150b, and the motor drive section 150c are input to a controller 150d. The controller 150d subjects the signals to arithmetic processing, and the like; delivers a result (signal) of arithmetic processing to the respective sections; and lets the respective sections perform driving and processing operations, to thus control the respective sections.

As mentioned above, the optical disk drive 150 of the fifth embodiment is equipped with the optical pickup device 90 of the second embodiment. Therefore, the influence of the steps 63 in the astigmatism generation element 60 made up of the Fresnel mirror 61 can be lessened at the wavelength λ2 for a CD as well as at the wavelength λ1 for a DVD, so that a superior servo characteristic can be exhibited. The optical pickup device 90 of the second embodiment may also be replaced with any one of the optical pickup devices of the first, third, and fourth embodiments.

As stated above, the optical pickup device and the optical disk drive of the present invention enable exhibition of a superior servo characteristic. Therefore, the optical pickup device or the optical disk drive is preferably incorporated in electronic equipment, such as a personal computer and a notebook computer.

The optical pickup device and the optical disk drive of the present invention can lessen the influence of the steps in the astigmatism generation element made up of the Fresnel mirror and exhibit a superior servo characteristic.

In the present invention, the depth of the innermost orbicular zone is made equal to or less than a wavelength of reflected light, so that light reflected from the astigmatism generation element made up of the Fresnel mirror does not induce interference.

In the present invention, when the depth of the steps is one-quarter times or three-quarters times a wavelength, a difference between a roundtrip optical path of light passing through higher positions of the steps and a roundtrip optical path of light passing through lower positions of the steps comes to one-half times or three-halves times the wavelength, and the influence of interference becomes maximum at a phase difference of 180°. So long as the depth ranges from one-half times to one-quarter times the wavelength or from three-eighths times or more, which is a half of three-quarters times, to five-eighths times less the wavelength, the influence of interference induced by the steps is not so great, and the optical pickup device can be used.

Further, in the present invention, the depth of the steps is set to five-eighths times or less the wavelength λ1 and three-eighths times or more the wavelength λ2, whereby the depth of the steps satisfies at the wavelength λ1 three-eighths times or more and five-eighths times or less the wavelength λ1, as well as satisfying at the wavelength λ2 three-eighths times or more and five-eighths times or less the wavelength λ2. Therefore, the influence of interference induced by the steps is not so great at the wavelength λ2 as well as at the wavelength λ1. Hence, the optical pickup device can be used.

In the present invention, the depth of the steps substantially equal to a wavelength is the minimum one of dimensions at which a difference between an optical path of light passing through higher portions of the steps and an optical path of light passing through lower positions of the steps is substantially a natural-number multiple of the wavelength and at which a phase difference does not arise. Therefore, the influence of the steps attributable to a phase difference is minimum, and a proportion of light that does not travel in a predetermined direction as a result of being shaded by the steps is also minimum. Moreover, a depth of the innermost orbicular zone is made larger than the depth of the steps, whereby the step located immediately outside the innermost orbicular zone can be arranged at a much outer position. Therefore, the steps can be arranged at positions spaced apart from the neighborhood of the center where influence on a servo characteristic is great. Therefore, the influence of the steps in the astigmatism generation element made up of a Fresnel lens can be lessened, so that a superior servo characteristic can be exhibited.

Further, in the present invention, when the depth of the steps is one-half times or three-halves times the wavelength, a difference between an optical path of light passing through higher portions of the steps and an optical path of light passing through lower portions of the steps comes to one-half times and three-halves times the wavelength, and the influence of interference becomes maximum at a phase difference of 180°. So long as the depth ranges from one time to one-half times the wavelength or from three-quarters times, which are a half of three-halves times, to five-quarters times or less the wavelength, the influence of the steps is not great, and the optical pickup device can be used.

Moreover, in the present invention, the depth of the steps is set to five-quarters times or less the wavelength $\lambda 1$ and three-quarters times or more the wavelength $\lambda 2$, whereby the depth of the steps satisfies at the wavelength $\lambda 1$ three-quarters times or more and five-quarters times or more the wavelength $\lambda 1$, as well as satisfying at the wavelength $\lambda 2$ three-quarters times or more and five-quarters times or more the wavelength $\lambda 2$. Therefore, the influence of interference attributable to the steps is not so great at the wavelength $\lambda 2$ as well as at the wavelength $\lambda 1$. Hence, the optical pickup device can be used.

This application claims the benefit of Japanese Patent application No. 2008-256045 filed on Oct. 1, 2009, the entire contents of which are incorporated herein by reference.

The invention claimed is:

1. An optical pickup device, comprising:
    a light source configured to emit light toward an optical disk;
    an objective lens configured to converge the outgoing light from the light source on the optical disk;
    an optical receiver configured to reflected light, the reflected light being the outgoing light passed through the objective lens after the outgoing light is reflected on the optical disk; and
    an astigmatism generation element interposed between the objective lens and the optical receiver, the astigmatism generation element generating light for focus control purpose that produces focal points in front of and behind the optical receiver within two mutually orthogonal cross-sectional planes including an optical axis of the reflected light;
    wherein the astigmatism generation element is a Fresnel mirror that has a plurality of orbicular zones and steps connecting adjacent orbicular zones to each other and that takes the orbicular zones as reflecting mirrors; and
    wherein a depth of the steps is set to substantially one-half of a wavelength of the light, and a portion of the Fresnel mirror at a center of the Fresnel mirror is thicker than each of the steps.

2. The optical pickup device according to claim 1, wherein a depth of the innermost orbicular zone of the orbicular zones is made equal to no more than a wavelength of the reflected light.

3. The optical pickup device according to claim 1, wherein the substantially one-half of the wavelength is between at least three-eighths times and no more than five-eighths times the wavelength of the reflected light.

4. The optical pickup device according to claim 1, wherein the light source emits light having a wavelength $\lambda 1$ and light having a wavelength $\lambda 2$ that is longer than the wavelength $\lambda 1$, and a depth of the steps in the astigmatism generation element where the light having the wavelength $\lambda 1$ and the light having the wavelength $\lambda 2$ enter is set to no more than five-eighths times the wavelength $\lambda 1$ and at least three-eighths times the wavelength $\lambda 2$.

5. The optical pickup device according to claim 4, wherein the depth of the innermost orbicular zone of the orbicular zones is set to no more than the wavelength $\lambda 2$.

* * * * *